DIFFERENTIAL MECHANISM FOR CALCULATING MACHINES

Original Filed July 19, 1950

INVENTOR.
THOMAS M. BUTLER
BY Fidler, Crause & Beardsley
ATTORNEYS

Nov. 9, 1954 T. M. BUTLER 2,693,906

DIFFERENTIAL MECHANISM FOR CALCULATING MACHINES

Original Filed July 19, 1950 20 Sheets-Sheet 2

INVENTOR.
THOMAS M. BUTLER
BY
Fidler, Crouse & Beardsley
ATTORNEYS

Nov. 9, 1954 T. M. BUTLER 2,693,906

DIFFERENTIAL MECHANISM FOR CALCULATING MACHINES

Original Filed July 19, 1950 20 Sheets-Sheet 3

INVENTOR.
THOMAS M. BUTLER
BY
Fidler, Crouse & Beardsley
ATTORNEYS

Nov. 9, 1954 T. M. BUTLER 2,693,906

DIFFERENTIAL MECHANISM FOR CALCULATING MACHINES

Original Filed July 19, 1950 20 Sheets-Sheet 4

INVENTOR.
THOMAS M. BUTLER
BY
Fidler, Crouse & Beardsley
ATTORNEYS

Nov. 9, 1954 T. M. BUTLER 2,693,906

DIFFERENTIAL MECHANISM FOR CALCULATING MACHINES

Original Filed July 19, 1950 20 Sheets-Sheet 5

INVENTOR.
THOMAS M. BUTLER
BY
Fidler, Crouse & Beardsley
ATTORNEYS

Nov. 9, 1954 T. M. BUTLER 2,693,906

DIFFERENTIAL MECHANISM FOR CALCULATING MACHINES

Original Filed July 19, 1950 20 Sheets-Sheet 6

INVENTOR
THOMAS M. BUTLER
BY
Fidler, Crouse & Beardsley
ATTORNEYS

DIFFERENTIAL MECHANISM FOR CALCULATING MACHINES

Original Filed July 19, 1950 20 Sheets-Sheet 7

INVENTOR
THOMAS M. BUTLER
BY Fidler, Crouse & Beardsley
ATTORNEYS

Nov. 9, 1954 T. M. BUTLER 2,693,906

DIFFERENTIAL MECHANISM FOR CALCULATING MACHINES

Original Filed July 19, 1950 20 Sheets-Sheet 8

INVENTOR
THOMAS M. BUTLER
BY Fidler, Crouse & Beardsley
ATTORNEYS

Nov. 9, 1954 T. M. BUTLER 2,693,906

DIFFERENTIAL MECHANISM FOR CALCULATING MACHINES

Original Filed July 19, 1950 20 Sheets-Sheet 9

INVENTOR
THOMAS M. BUTLER
BY Fidler, Crouse & Beardsley
ATTORNEYS

INVENTOR
THOMAS M. BUTLER
BY Fidler, Crouse & Beardsley
ATTORNEYS

DIFFERENTIAL MECHANISM FOR CALCULATING MACHINES

Original Filed July 19, 1950

INVENTOR
THOMAS M. BUTLER
BY Fidler, Crouse & Beardsley
ATTORNEYS

INVENTOR
THOMAS M. BUTLER
BY Fidler, Crouse & Beardsley
ATTORNEYS

Nov. 9, 1954 T. M. BUTLER 2,693,906

DIFFERENTIAL MECHANISM FOR CALCULATING MACHINES

Original Filed July 19, 1950 20 Sheets-Sheet 13

INVENTOR
THOMAS M. BUTLER
BY Fidler, Crouse & Beardsley
ATTORNEYS

Nov. 9, 1954 T. M. BUTLER 2,693,906

DIFFERENTIAL MECHANISM FOR CALCULATING MACHINES

Original Filed July 19, 1950 20 Sheets-Sheet 14

INVENTOR
THOMAS M. BUTLER
BY
Fidler, Crouse & Beardsley
ATTORNEYS

DIFFERENTIAL MECHANISM FOR CALCULATING MACHINES
Original Filed July 19, 1950 20 Sheets-Sheet 15
Fig. 28.
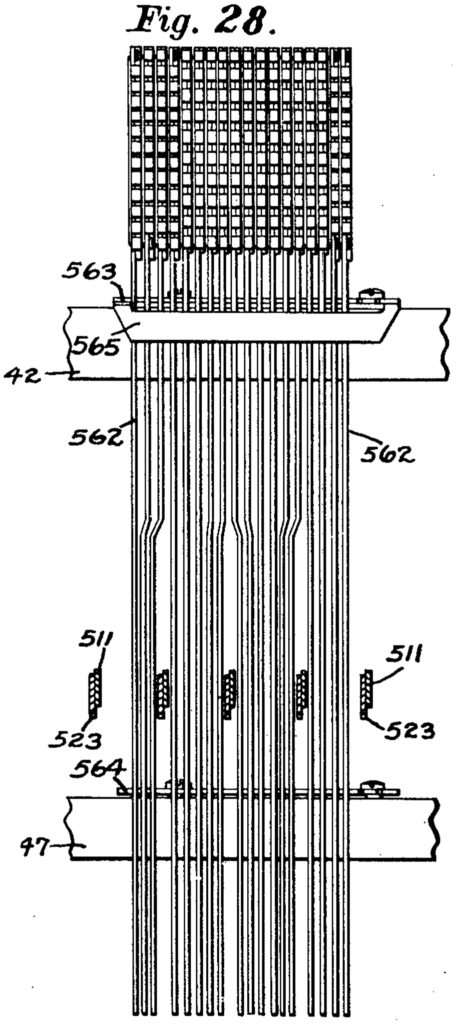
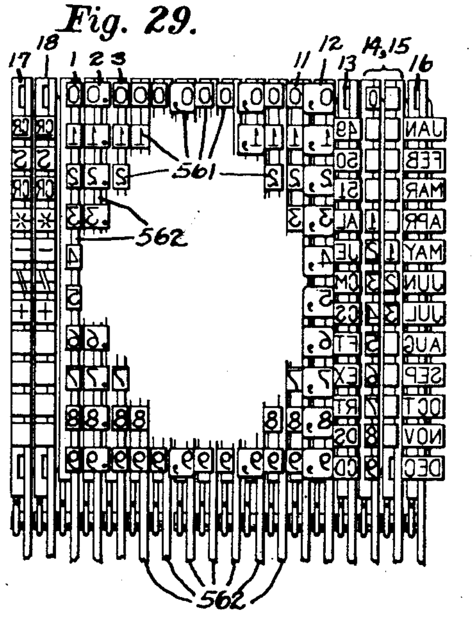
INVENTOR.
THOMAS M. BUTLER
BY
Fidler, Crouse & Beardsley
ATTORNEYS Nov. 9, 1954 T. M. BUTLER 2,693,906

DIFFERENTIAL MECHANISM FOR CALCULATING MACHINES

Original Filed July 19, 1950 20 Sheets-Sheet 16

INVENTOR
THOMAS M. BUTLER
BY Fidler, Crouse & Beardsley
ATTORNEYS

DIFFERENTIAL MECHANISM FOR CALCULATING MACHINES

Original Filed July 19, 1950

INVENTOR
THOMAS M. BUTLER
BY *Fidler, Crouse & Beardsley*
ATTORNEYS

Nov. 9, 1954 T. M. BUTLER 2,693,906

DIFFERENTIAL MECHANISM FOR CALCULATING MACHINES

Original Filed July 19, 1950 20 Sheets-Sheet 18

INVENTOR.
THOMAS M. BUTLER
BY Fidler, Crouse & Beardsley
ATTORNEYS

Nov. 9, 1954 T. M. BUTLER 2,693,906

DIFFERENTIAL MECHANISM FOR CALCULATING MACHINES

Original Filed July 19, 1950 20 Sheets-Sheet 19

INVENTOR
THOMAS M. BUTLER
BY Kidder, Crouse & Beardsley
ATTORNEYS

INVENTOR
THOMAS M. BUTLER
BY Fidler, Crouse & Beardsley
ATTORNEYS

United States Patent Office 2,693,906

Patented Nov. 9, 1954

2,693,906

DIFFERENTIAL MECHANISM FOR CALCULATING MACHINES

Thomas M. Butler, Detroit, Mich., assignor to Burroughs Corporation, Detroit, Mich., a corporation of Michigan Original application July 19, 1950, Serial No. 174,696. Divided and this application October 23, 1951, Serial No. 252,713

5 Claims. (Cl. 235—60.31)

The present invention relates to improved differential mechanism for calculating machines of the key-set type.

The present application is a division of my copending application Serial No. 174,696, now Patent No. 2,629,549, filed July 19, 1950, as a continuation-in-part of my original application Serial No. 85,971, filed April 7, 1949, and now abandoned. Other features of the machine disclosed in said original and continuations-in-part applications are the subjects of application Serial No. 167,875, filed June 13, 1950, now Patent No. 2,627,333, as a division of said original application, application Serial No. 181,401, filed August 25, 1950, as a continuation-in-part of said original application, application Serial No. 196,844, filed November 21, 1950, as a division of said original application, and applications Serial No. 278,260, and Serial No. 282,843, filed March 24, 1952, and April 17, 1952, respectively, as divisions of said continuation-in-part application Serial No. 174,696.

An object of the present invention is to provide a differential mechanism characterized by complete reliability and accuracy of operation while permitting the fullest utilization of the working time of the machine to achieve maximum work output.

A further object is to provide an improved differential means permitting restoration of the keyboard very early in the machine operation to permit the operator to utilize as much as possible of the time of a machine operation to make the keyboard entries for the next operation. A further object is to provide an improved differential mechanism permitting total-taking operations of the machine while amount keys remain in depressed position without causing inaccuracy in the result.

A further object is to provide an improved differential mechanism having differential actuator members which are movable early in a cycle of operation of a calculating machine to differential positions under the control of differential stop means controlled by depressed keys, which differential actuator members are then detained in their differential positions by means independent of the depressed keys which, together with said stop means, may then be returned to normal while the differential actuator members are still in their differential positions.

A further object is to provide a differential mechanism as stated above with a differential stop means of such character and so arranged in relation to the keys controlling it and the differential actuator members controlled by it that the release and restoration of the depressed keys may be effected and the restoration of the differential stop mechanism may be commenced substantially prior to the arrival of differential actuator members at the differential positions farthest from their normal positions.

A further object is to provide an improved differential mechanism operating with greatly reduced shock, noise and wear, particularly in total-taking operations.

A further object of the invention is to include in a differential mechanism as stated above, provisions to prevent the differential actuator members from unnecessarily or objectionably moving, at any time in a machine operation, beyond the differential positions necessary for that machine operation.

The foregoing and other objects and advantages of the invention will be shown in detail in the following description of my invention with reference to a preferred embodiment thereof illustrated in the accompanying drawings in which.

Figures 14, 15:
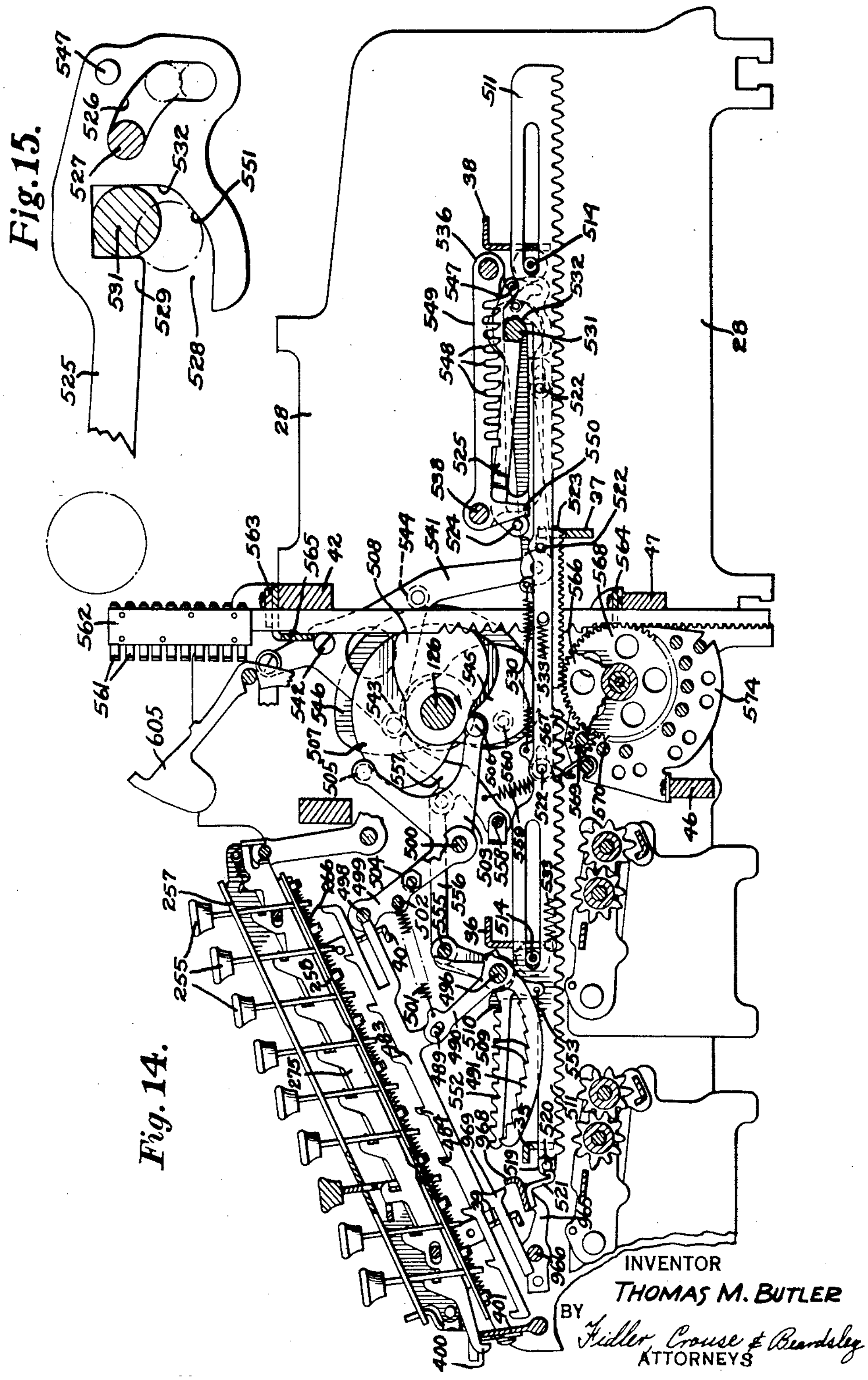
Fig. 14 is a vertical longitudinal section of the machine illustrating the differential stop means and the differential actuator means controlled thereby for controlling a single order of the printing mechanism and of the totalizers, the illustrated parts being viewed from the right and numerous other elements being omitted for clearness.
Fig. 15 is an enlarged detail of a portion of Fig. 14.
Figures 16, 17, 18:
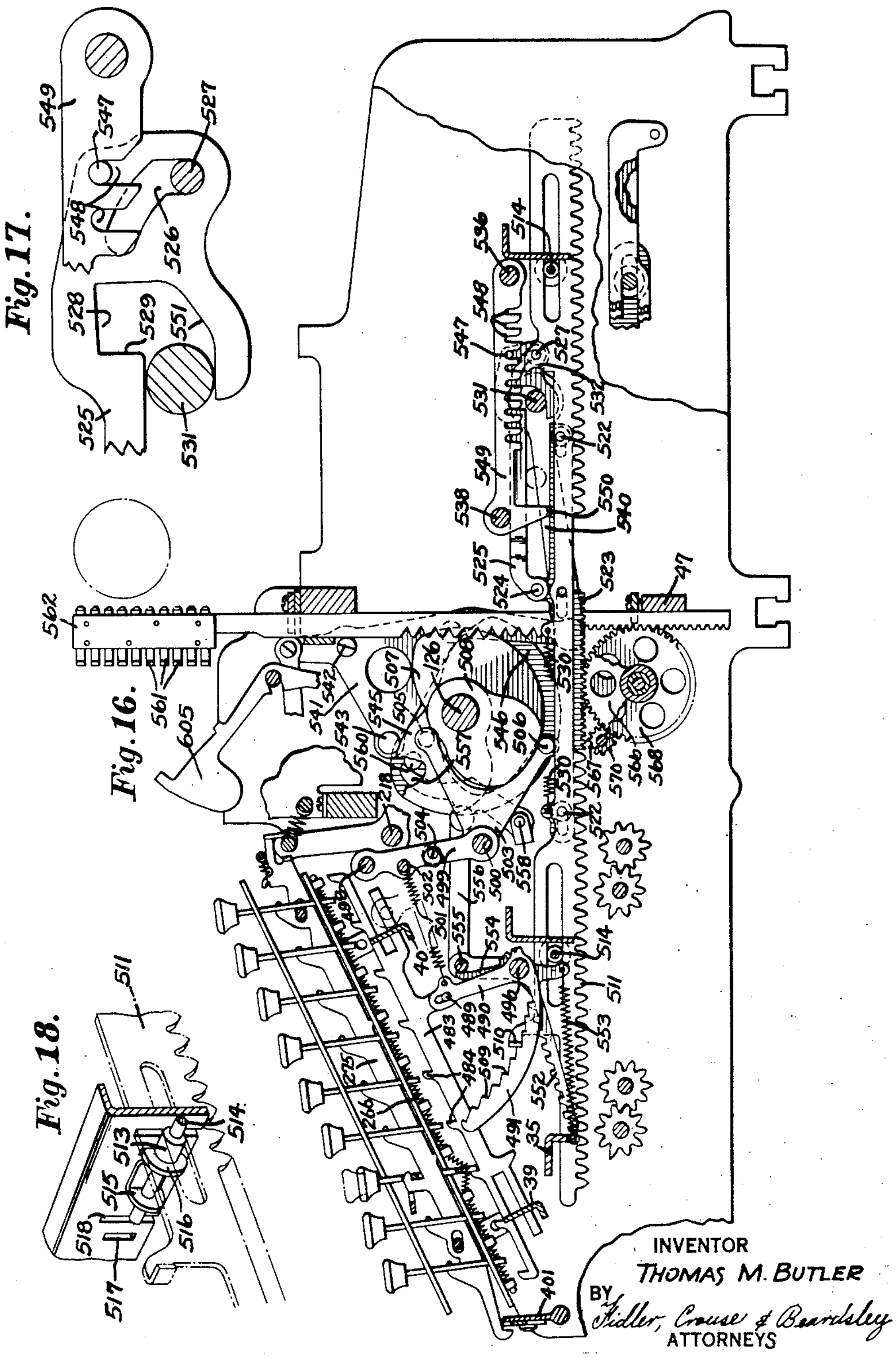
Figures 19, 20, 21:
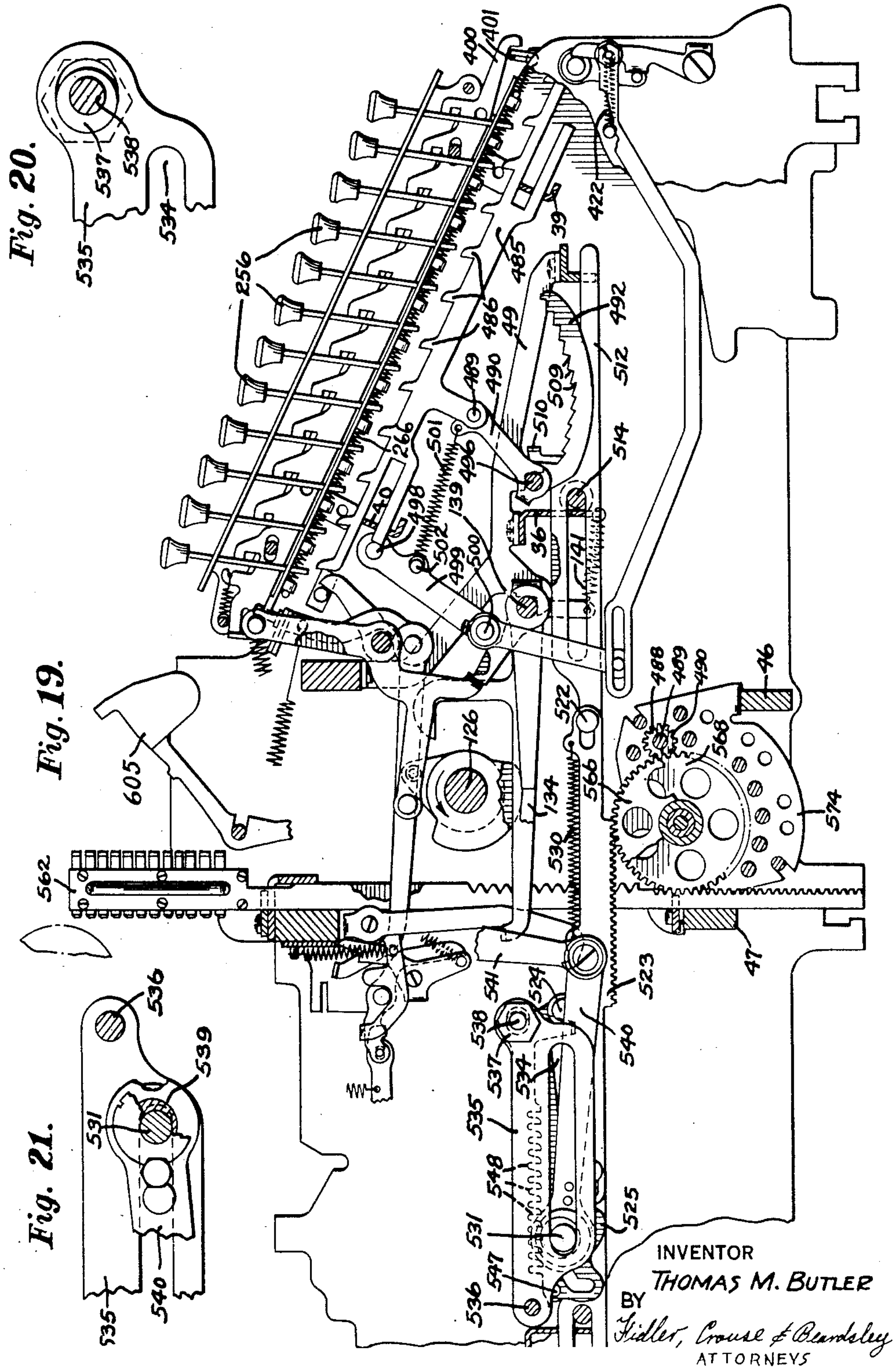
Figure 22:
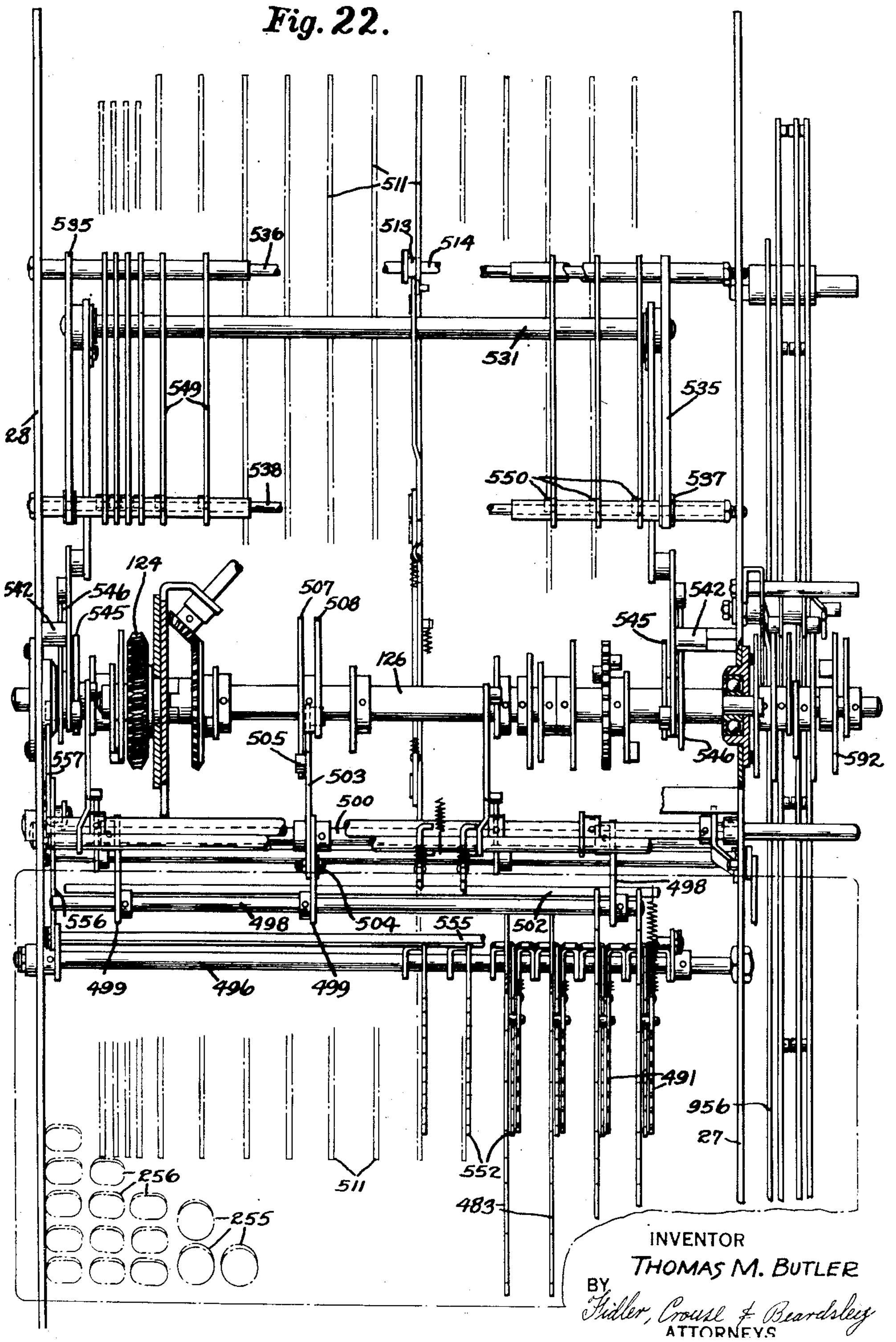
Figures 23, 24, 25, 26, 27:
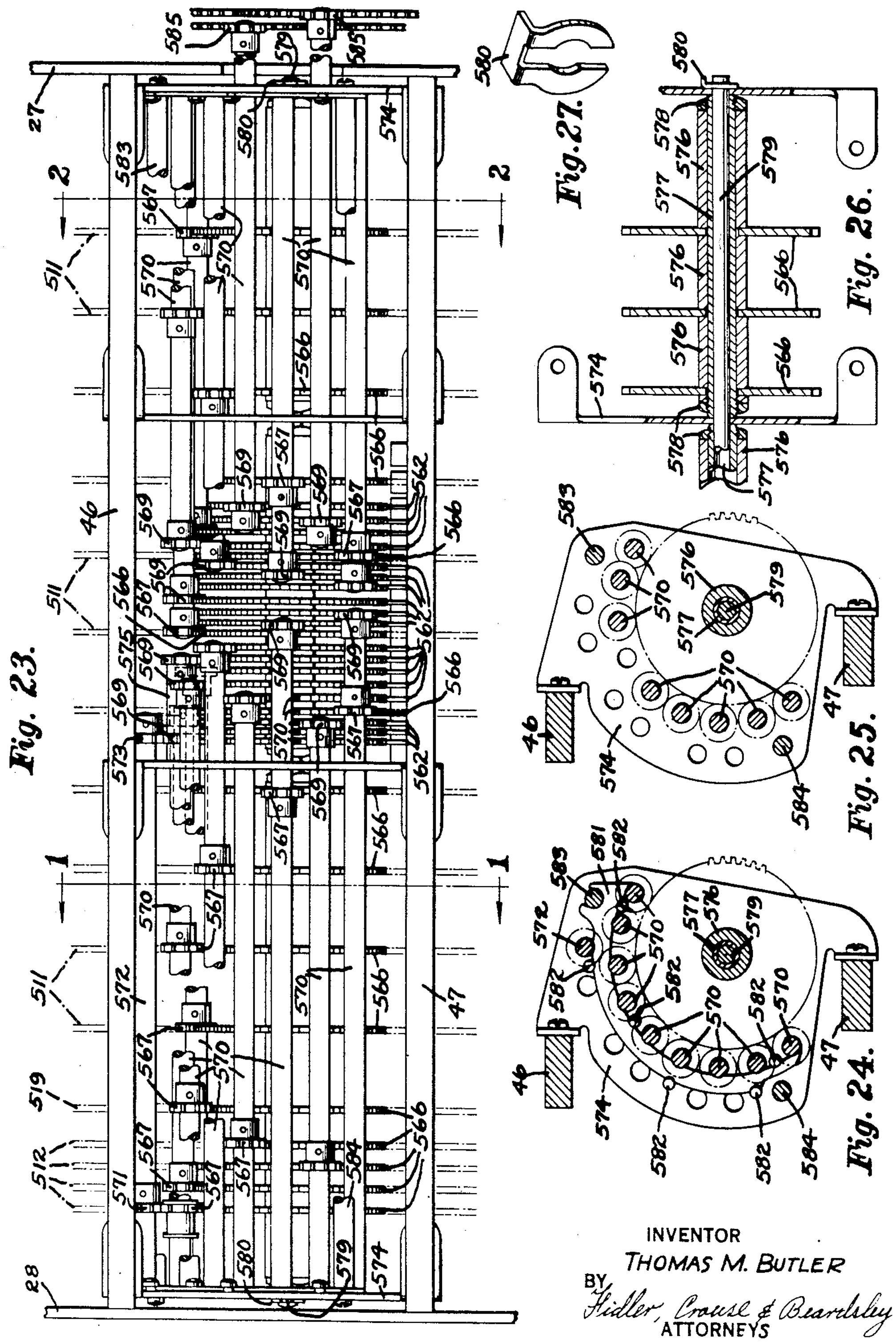
Figure 30:
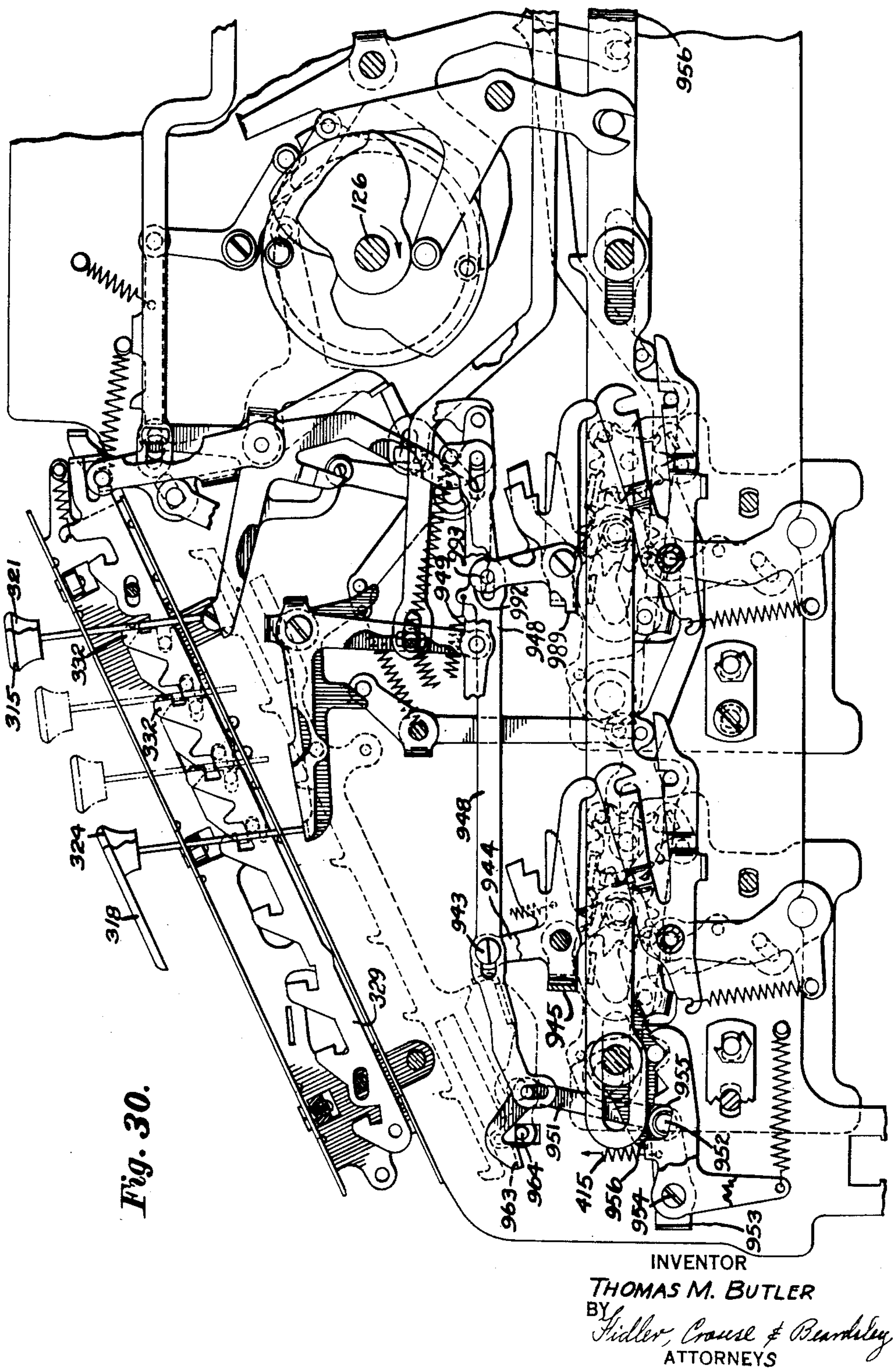
Figure 31:
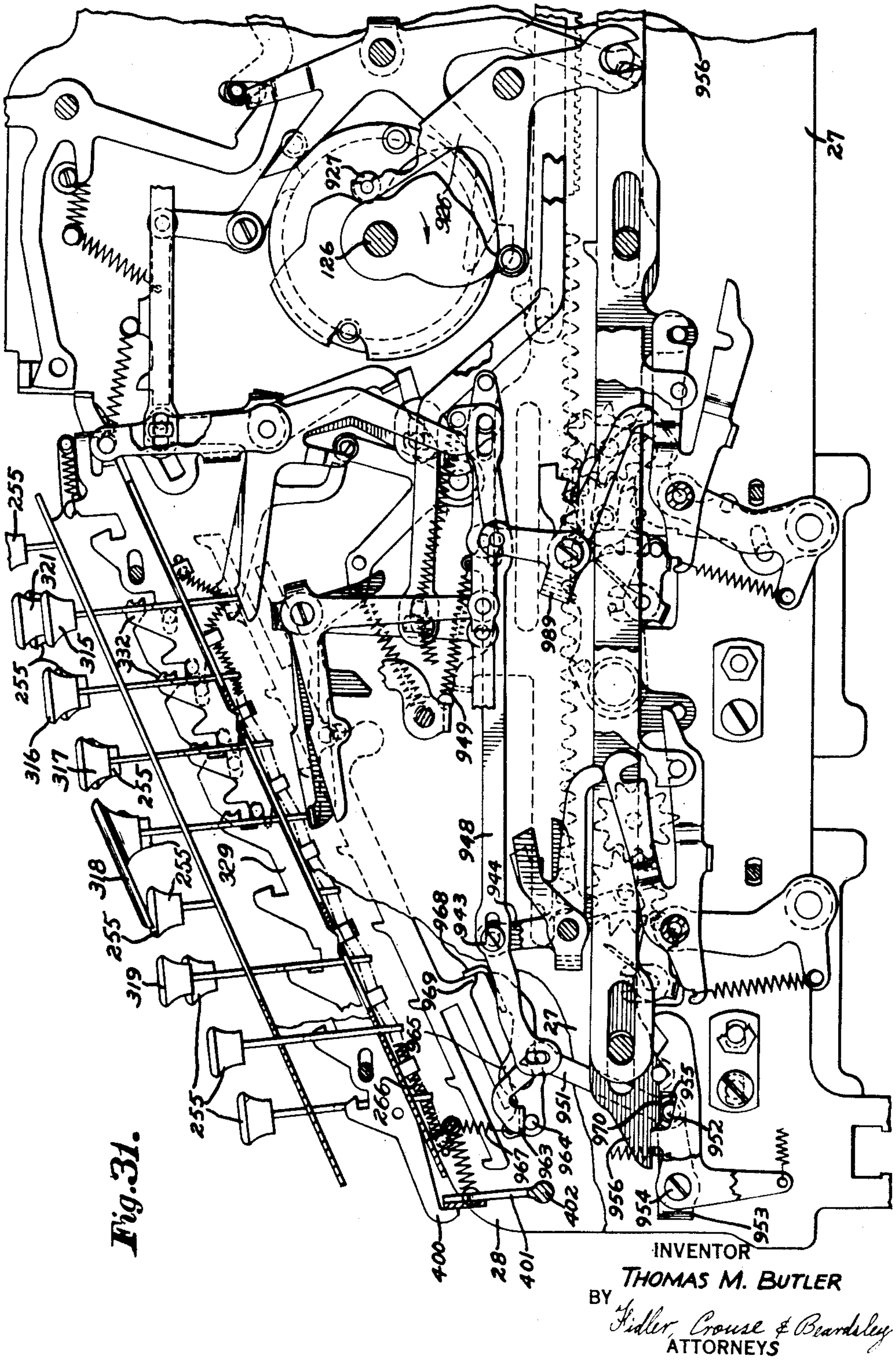
Figure 32:
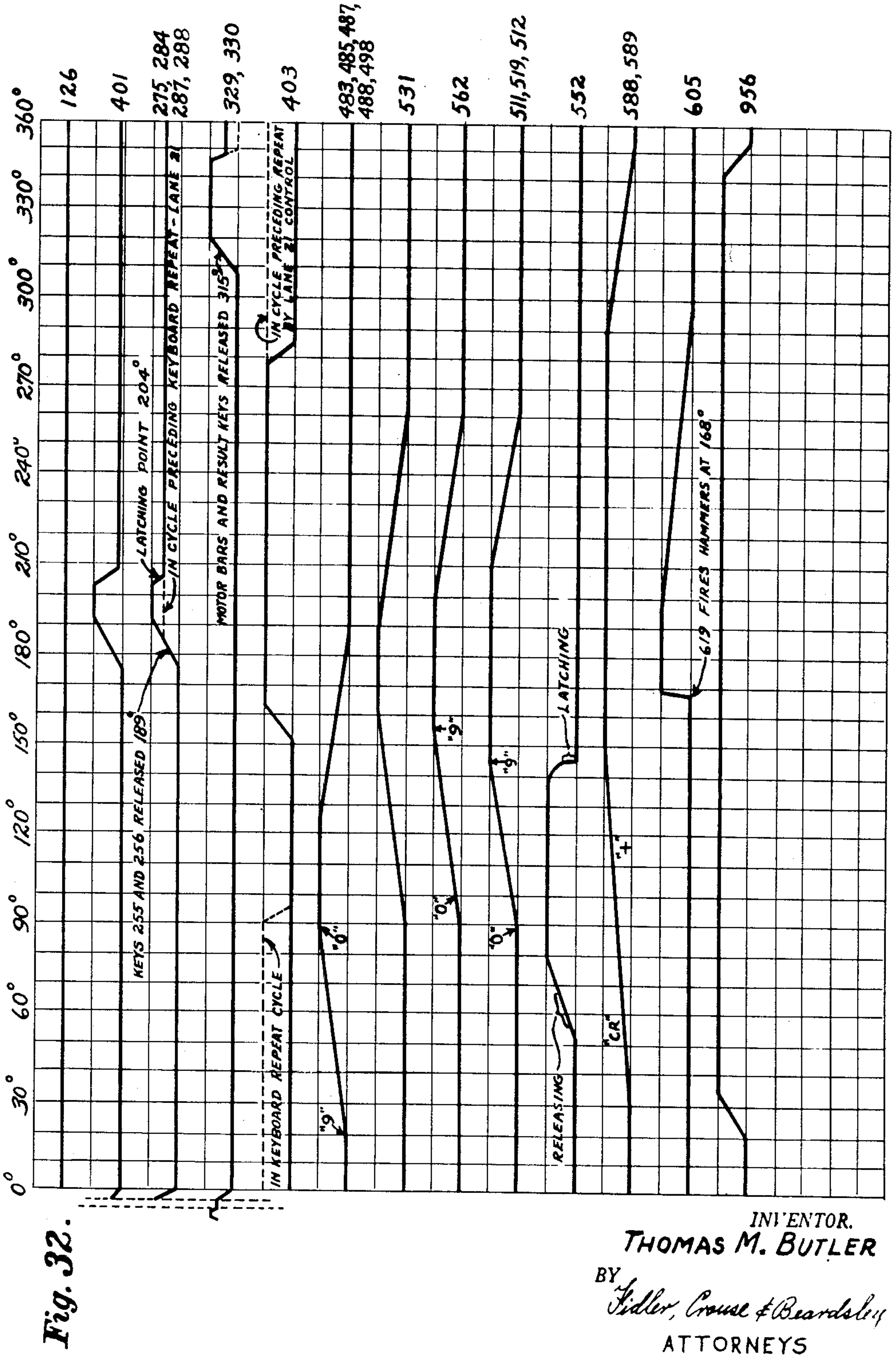
Figure 33:
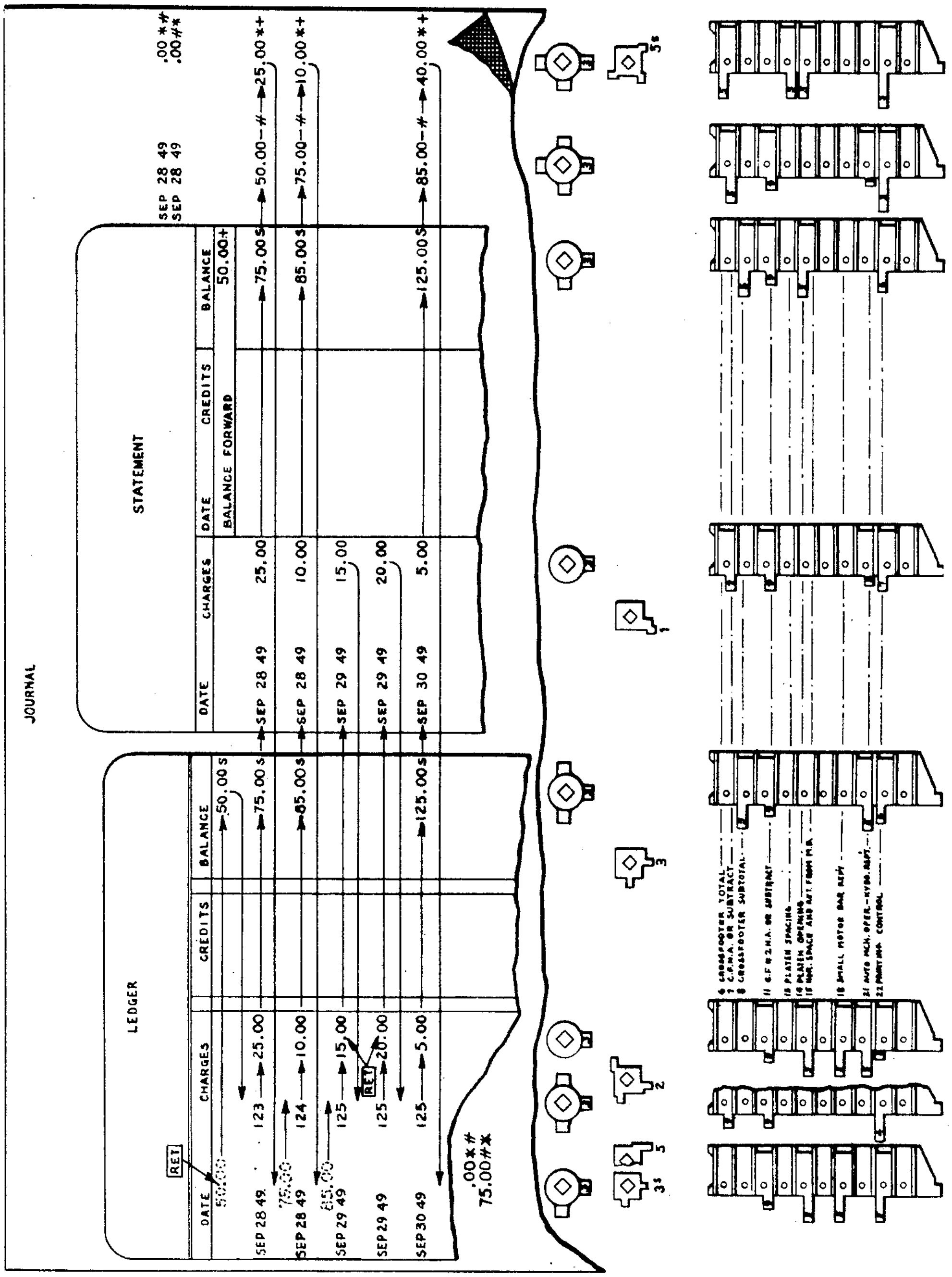
Figure 34:
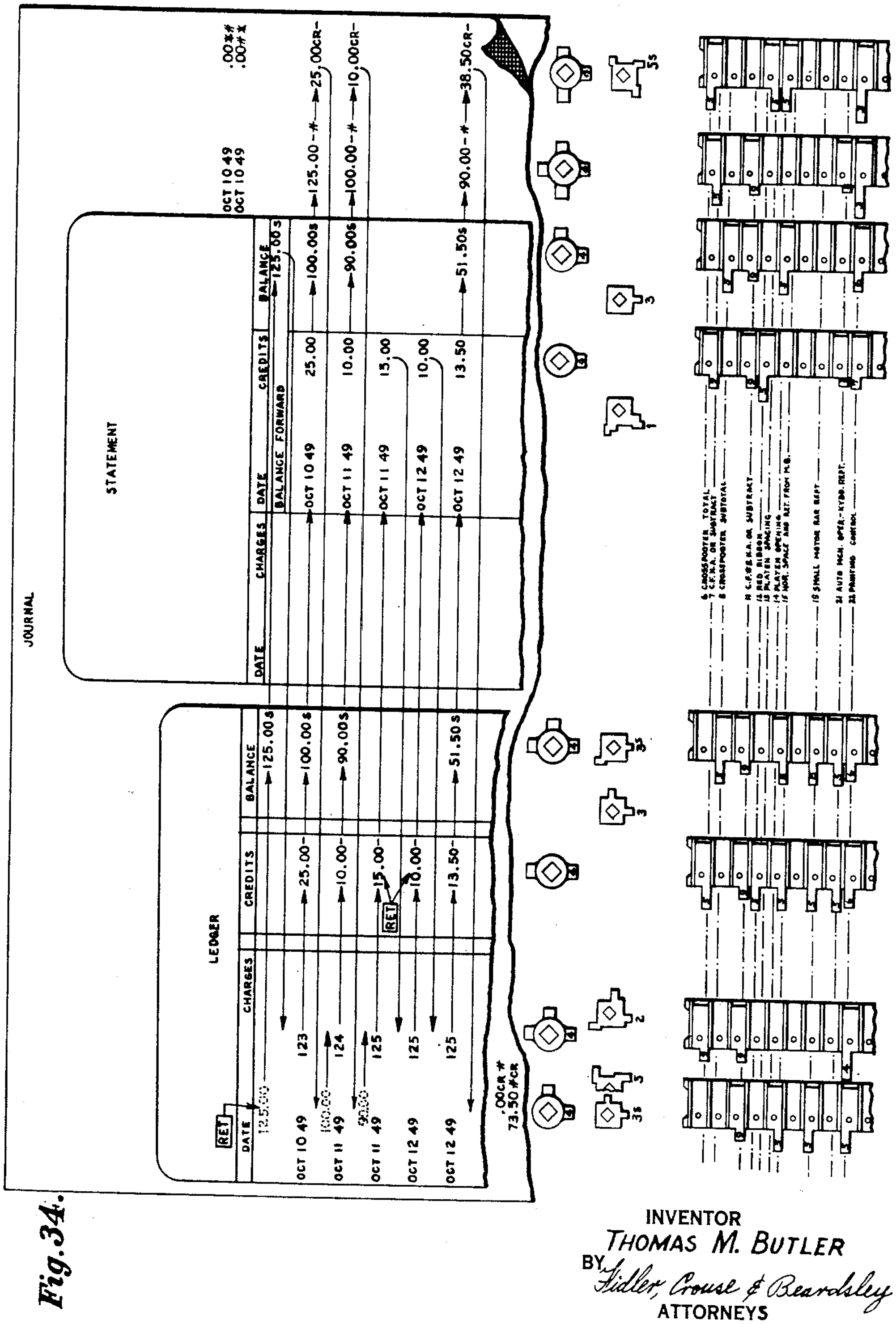

Figs. 16 and 17 are similar to Figs. 14 and 15, respectively, but show the parts in moved positions at about the 130° point in the rotation of the main shaft of the machine;

Fig. 18 is a detail of support and guide means for the differential actuators;

Fig. 19 shows certain of the parts of Fig. 14 as viewed from the left with certain of the motor-starting switch controlling elements and other elements added;

Figs. 20 and 21 are details of certain elements of Fig. 19;

Fig. 22 is a plan view of some portions of the differential actuator mechanism of the main operation shaft and of certain totalizer operating elements;

Fig. 23 is a bottom plan view of an assembly of gearing through which the printing type bars are indexed from the differential actuator mechanism;

Figs. 24 and 25 are sections on the lines 1—1 and 2—2, respectively, of Fig. 23;

Figs. 26 and 27 are details of elements of Fig. 23;

Fig. 28 is a front elevation of the type bars;

Fig. 29 is a rear elevation of the upper portion of the type bars;

Fig. 30 is a right side elevation of portions of the totalizer controlling and operating means particularly for total-taking and subtract operations, various parts being broken away or omitted for clearness;

Fig. 31 is generally similar to Fig. 30 but shows some of the parts in moved positions early in a machine operation in which a total will be taken;

Fig. 32 is a timing chart in which the various graph lines are designated by the same reference numerals as those identifying the parts, the timing of which is depicted by such graph lines; and Figs. 33 and 34 illustrate one of many kinds of accounting work which may be performed on the machine.

The present invention is herein illustrated and described as embodied in the calculating and accounting machine disclosed in full detail in my above-mentioned application Serial No. 174,696. Those structures and mechanisms of the machine with which the present invention is concerned are illustrated and described herein to the extent required for a full understanding of the present invention. To provide for simple and easy identification of the various elements of the machine in the present and the above-mentioned applications, the parts illustrated and described herein are designated by the same reference numbers as in my above-mentioned application Serial No. 174,696, to which reference may be had for disclosure of those features of the machine which are not shown and described completely herein.

Throughout the following description, consistently with the description in my above-mentioned applications, the words clockwise and counterclockwise will be used to describe positions and motions of elements of the machine as seen by an observer in front of, at the right, or above the moving parts in the positions in which they are located in the machine. The words right, rightward, left and leftward will be employed to describe positions and motions as seen by an observer in front of the machine. The words above, up, upward, below, down, downward, front, forward, rear, rearward, and behind will be employed to describe positions and motions as they occur in the machine when it is in its normal upright position.

Figure 1:
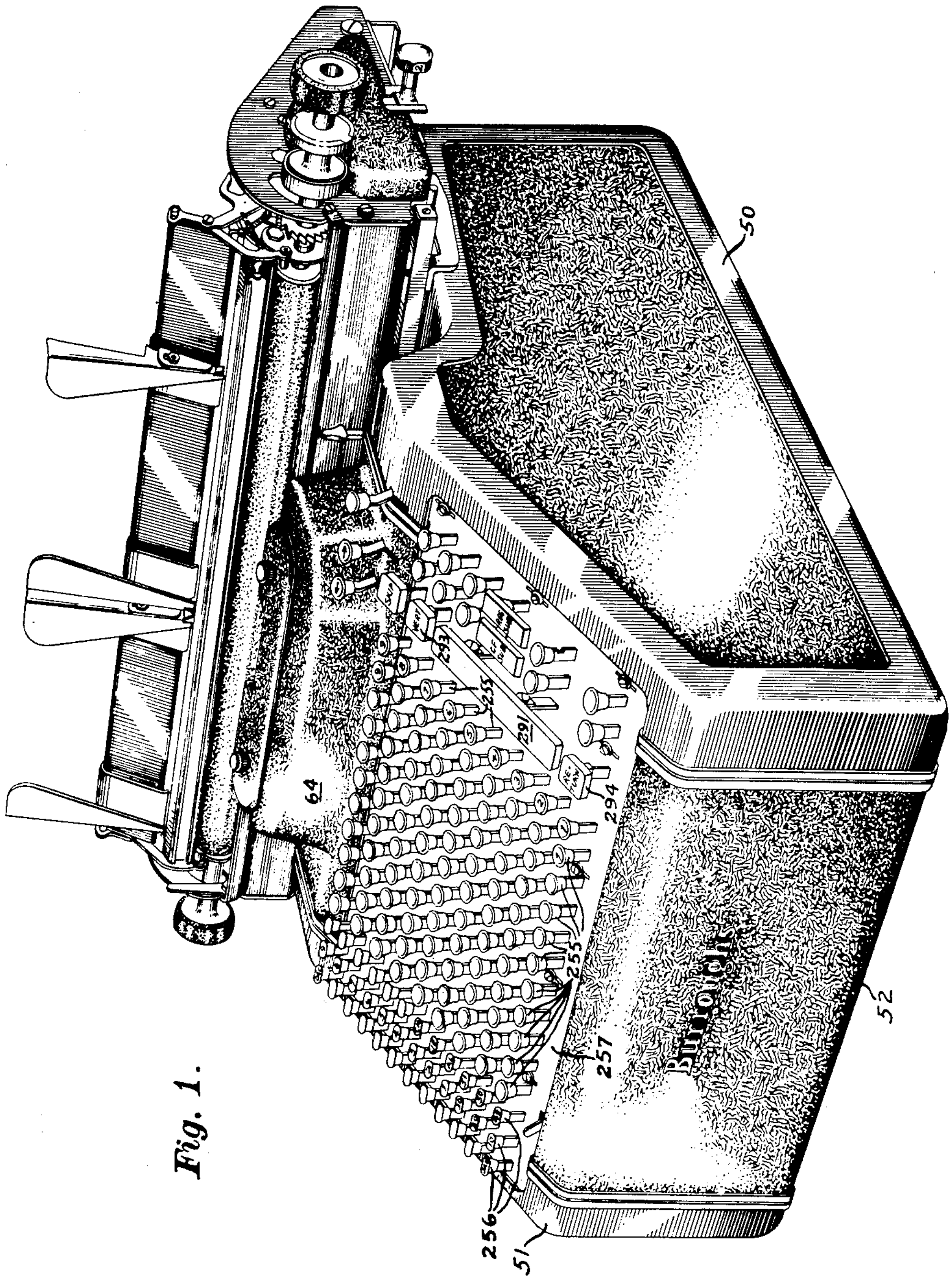
Fig. 1 is a perspective view of a machine embodying the present invention, enclosed in its casing, as seen from a point forwardly, above and to the right thereof.
Figure 2:
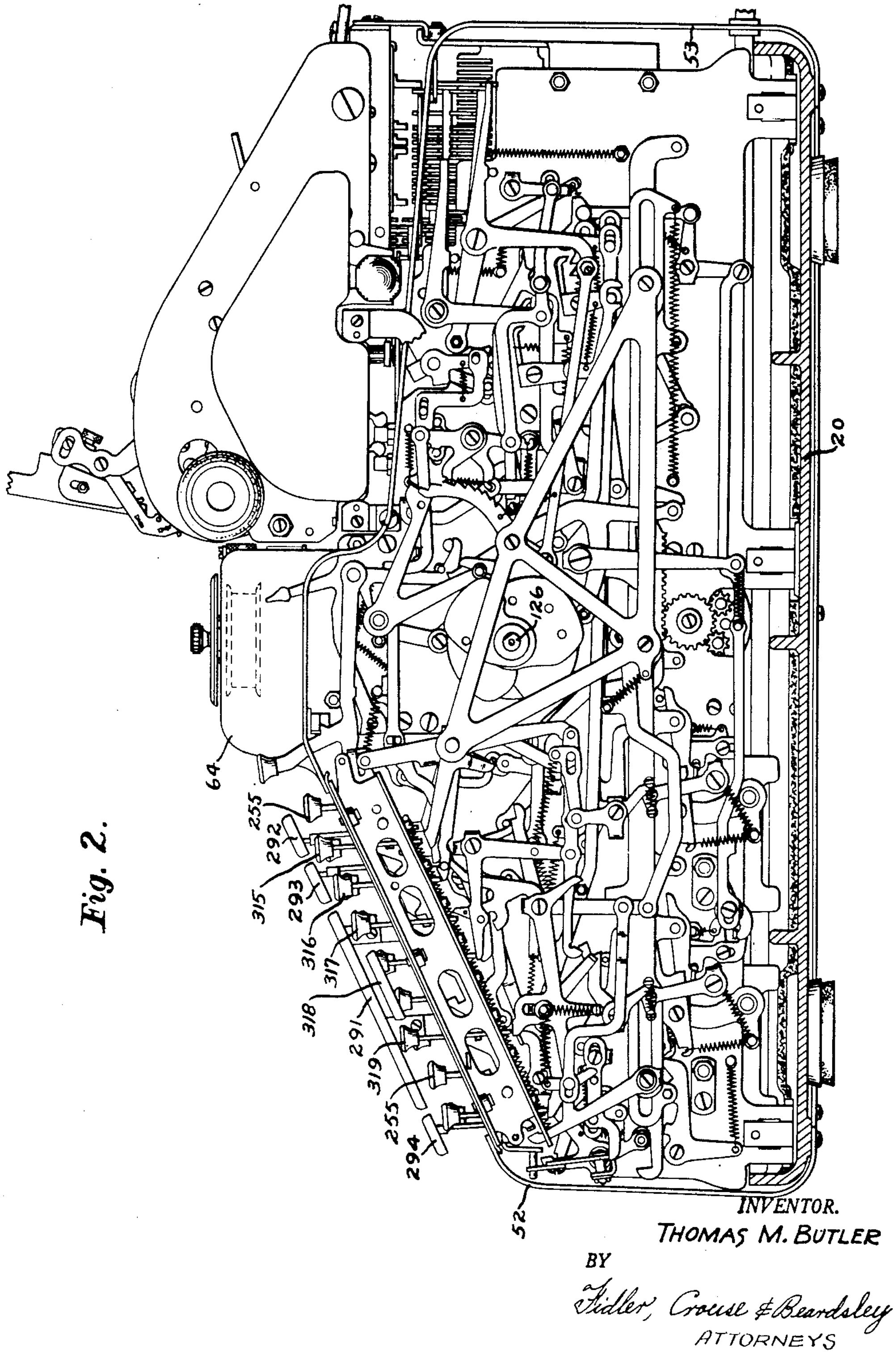
Fig. 2 is a right side elevation of the machine with the right side of the casing removed.

The various mechanisms of the illustrated machine are supported on or within a frame comprising right and left side frame plates 27 and 28, respectively (Figs. 3 and 4), which are secured to and supported on a base pan 20 and which are further secured together in rigid spaced relation by various transverse members as described in detail in my application Serial No. 174,696. The base pan 20 and a casing comprising a plurality of panels or sections 51, 52, 53 and 64 (Figs. 1 and 2), substantially completely enclose the machine excepting the keyboard and paper carriage.

*Machine drive*

Figure 5:
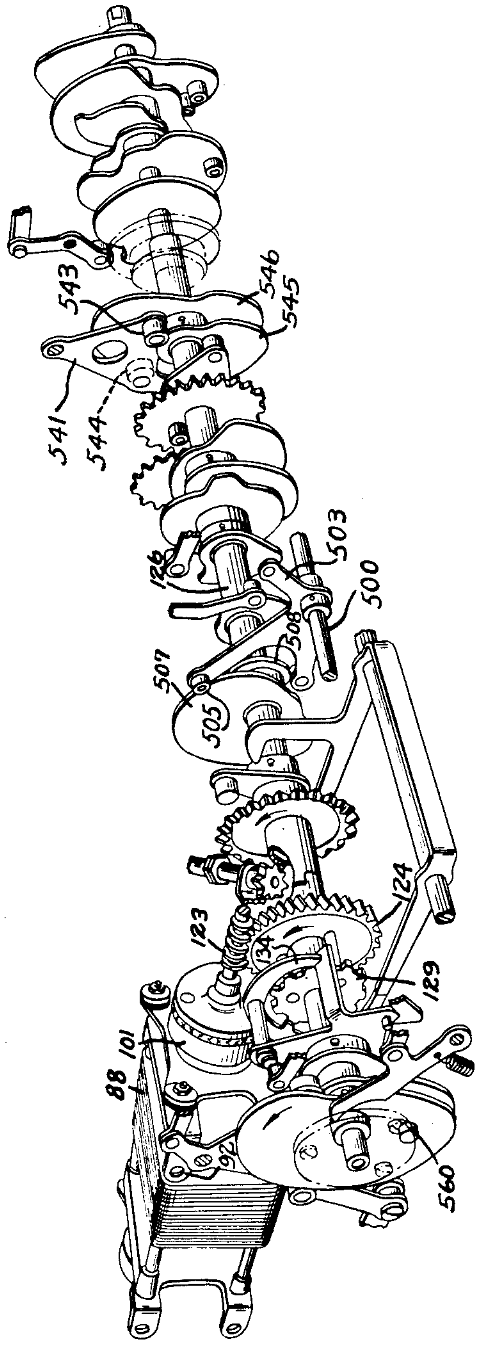
Fig. 5 is a perspective of the drive motor and main operating shaft with the cams and gears for operating various portions of the machine assembled thereon, the lateral separation of some of said cams and gears being exaggerated to reveal them more clearly.
Figure 6:
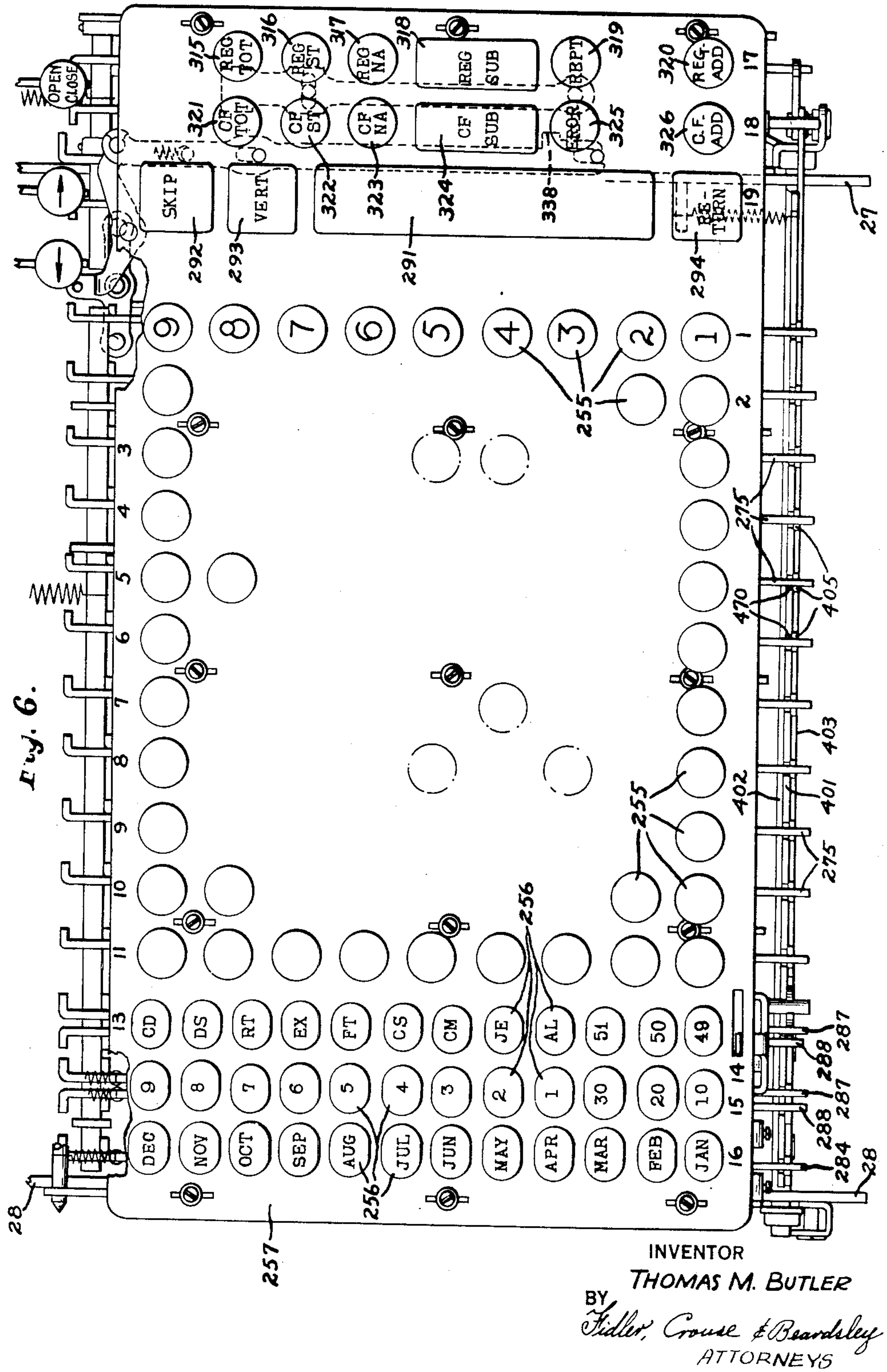
Fig. 6 is a plan view of the keyboard.

The machine is driven through cycles of operation by an electric motor 88 (Fig. 5) through an overload slip clutch 101, a worm 123, worm gear 124, machine cycling clutch comprising the toothed disk 129 and clutch pawl 134, and the main drive cam shaft 126. As disclosed in detail in my applications Ser. Nos. 174,696 and 196,884, the motor and clutch are controlled for driving the machine through cycles of operation by a number of motor bars 291, 292, 293 and 294 and "live" function control keys 315, 316, 318, 321, 322, and 324 (Figs. 1 and 6) on the keyboard, and by automatic control means in accordance with the columnar positions of the traveling paper carriage.

*Keyboard*

To aid understanding of the organization of certain mechanisms of the machine, the different orders of the keyboard and the differential, printing and computing mechanisms of the machine have been designated by the numbers 1 to 19. Accordingly the eleven rows of amount keys 255 are numbered from 1 to 11 in the accompanying drawings. The computing mechanism, as disclosed in my application Serial No. 174,696, has twelve numerical orders, the twelfth being an overflow order for which no row of amount keys is provided on the keyboard, though differential mechanism and printing mechanism is provided for that order so that the full totals accumulated in the computing mechanism may be drawn and printed. The three rows of date and character keys 256 are numbered 13, 14—15 and 16. Two orders 14 and 15 of differential mechanism controlling two orders 14 and 15 of printing mechanism are controlled, respectively, by the rear group of nine keys 256 and the front group of three keys 256 of the key row 14—15. The two function-control key-rows are numbered 17 and 18 and the row of motor bars is numbered 19. No differential mechanism or printing mechanism is provided for the motor bar row 19.

Figures 7, 8, 9, 10:
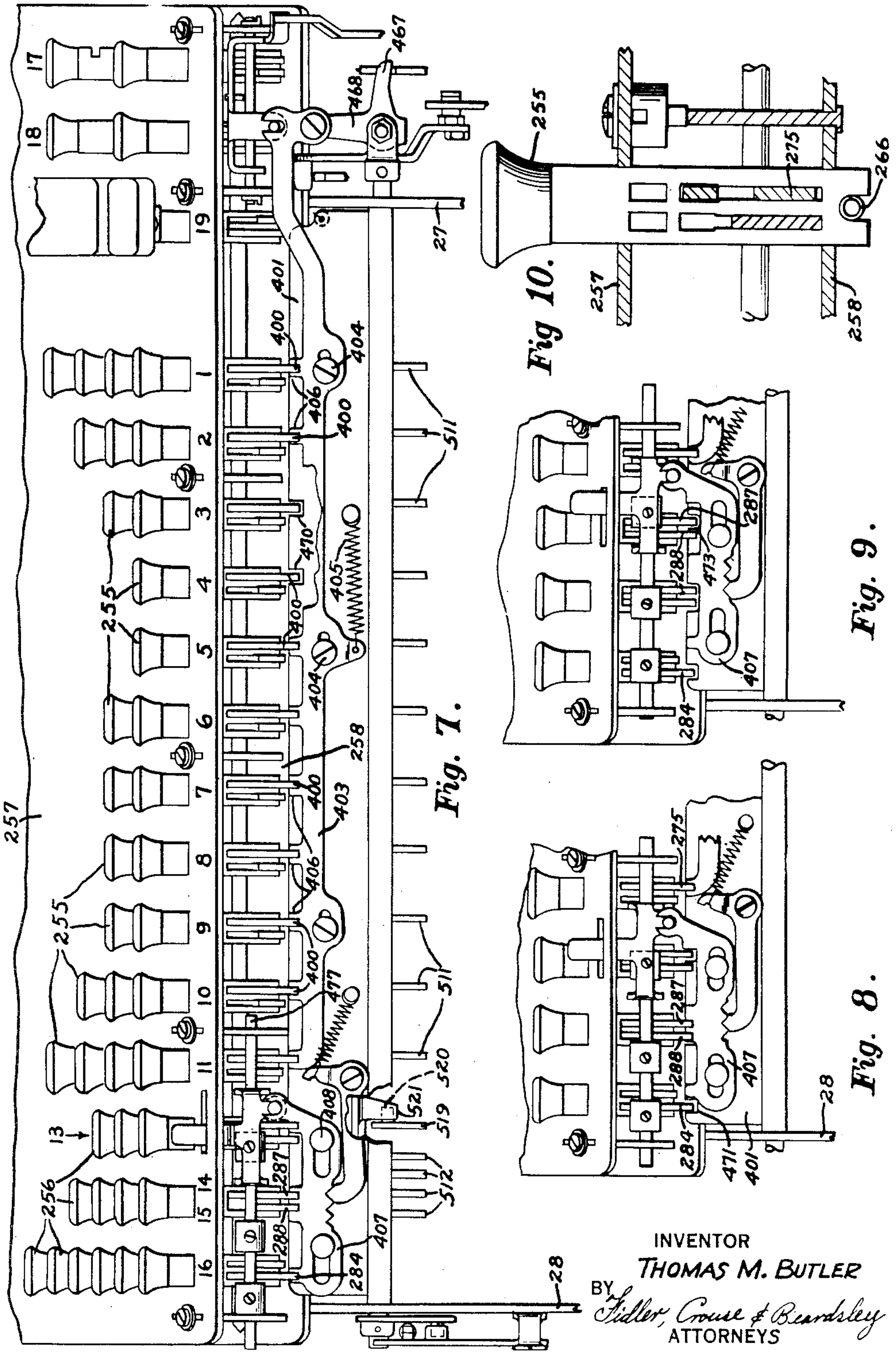
Fig. 7 is a front elevation of the keyboard and certain elements of the key latching and releasing means.
Figs. 8, 9 and 10 are details of the keyboard.

The construction and operation of the keyboard are described and illustrated in detail in my copending applications Ser. Nos.174,696 and 196,884. As disclosed in those applications, the stems of the date and character keys 256, amount keys 255, control keys 315 to 326 and motor bars 292, 293 and 294 are upwardly and downwardly slidably mounted in upper and lower keyboard plates 257 and 258 (Figs. 7 to 10) and are urged to and normally held in elevated position by springs 266 (Figs. 10, 14 and 19). Each key 255 or 256, when depressed, is latched in depressed position by a key latch slide. One such key latch slide 275 (Figs. 6 to 14) passes through slots in the stems of all keys 255 of the row of amount keys 255 for each of the orders 1 to 11, inclusive, and another similar latch slide 284 (Figs. 7 and 11) is provided for the row of keys 256 for the order 16. Two latch slides 287 and 288 (Figs. 7, 12 and 13) are provided for the front three keys 256 and for the rear nine keys 256, respectively, in each of the two rows of keys 256 for the order 13 and the orders 14 and 15. Each of the latch slides 275 for the rows of amount keys 255 has a depending hook 400 (Figs. 7 and 14) in front of an upward projection 406 on a slide 403 laterally slidably mounted on the front face of a blade 401 leaving, at its opposite ends and near its lower edge, trunnions journalled in the frame plates 27 and the blade 401 is formed with a series of notches 470 (Figs. 6 and 7) aligned with and adapted to pass the depending hooks 400 of the key latch slides 275 but normally covered, as shown, by the projections 406 of the slide 403. As each machine cycle is being initiated the latch slides 275, 284, 287 and 288 are pulled rearwardly, as explained in my application Ser. No. 174,696, sufficiently to lock undepressed keys 255 and 256 against depression throughout the first half of the machine cycle. At about the mid-point of each cycle of operation of the machine, the blade 401 is rocked counter-clockwise so that, if the slide 403 remains in normal position, its lugs 406 will pull the latch slides 275 forwardly to release all depressed amount keys 255 at about the 180° point in the machine cycle for restoration by the springs 266. Very soon thereafter the blade 401 is returned to its normal position and permits the return to normal of the latch slides 275, 284, 287 and 288 so that in any machine cycle which is not to be followed by a cycle in which the previously entered item is to be repeated, the keyboard is in condition for the setting up of a new item beginning at about the 204° point of the machine cycle. Means conditionable by the repeat key 319 and by carriage-governed automatic control means through the bell crank 467, 468 (Fig. 7), as disclosed in detail in my copending applications Ser. Nos. 174,696 and 196,884, are provided for shifting the slide 403 leftwardly prior to the counter-clockwise rocking of the blade 401 to displace the lugs 406 from alignment with the hooks 400 so that the latches 275 will not be operated and the depressed amount keys 255 will remain latched in depressed position and the set-up amount will be repeated in a subsequent machine cycle.

The blade 401 is also formed with notches 471, 472 and 473 and provided with a manually settable slide 407 (Figs. 7, 8 and 9) to permit repeating of data entered on the front three keys 256 of the key row 13 and on the keys 256 of the key row 14—15 and the key row 16.

The blade 401 may be rocked to release all depressed keys 255 at any time while the machine is at rest by depression of the error key 325. Such depression of the error key will also cause release of those of the keys 256 as will also be released automatically in machine cycles in consequence of the position of the slide 407.

*Differential mechanism*

Entries on the keys 255 and 256 are transmitted to the printing mechanism and entries on the keys 255 may also be transmitted to calculating mechanisms, as hereinafter described, through differential mechanism comprising a series of differential stop slides supported for forward and rearward sliding movement beneath the keyboard by comb plates 39 and 40 (Fig. 14) secured at their ends to the frame plates 27 and 28. The differential stop slide 483 under each amount key-row 1 to 11 has, on its upper edge, a series of upwardly projecting stops 484 (Figs. 14) comprising one such stop for each amount key 255 in the row. The stops 484 cooperate with the lower ends of the stems of the respective keys 255 at the right sides of the notches receiving the springs 266. The nine stops 484 on each slide 483 are spaced apart along the top of the slide at distances greater than the distance between the stems of adjacent keys 255 in the respective key-row so that, in the normal positions of the parts with the machine at rest, the distances between the several stops 484 and the stems of the respective keys 255 with which they cooperate increase progressively from the rear to the front and the amount of movement of each slide 483 required to bring a stop 484 into engagement with the stem of a depressed key 255 in the respective key-row decreases as the value of the numeral assigned to the depressed key increases.

In each of the key-rows 13, 14—15 and 16 the twelve keys 256 are positioned closer together in the row than are the keys 255 of the amount key-rows 1 to 11. In the illustrated machine, the spacing between adjacent keys 255 of the same key-row is somewhat less than the length of the maximum required fore-and-aft movement of the differential stop slides for those key-rows.

For each of the key-rows 13 and 16 there is a differential stop slide 485 (Figs. 11 and 13) differing somewhat from the stop slides 483 for the amount key-rows. Each of the two slides 485 (Figs. 11 and 13) has twelve stops 486. The first five stops 486 at the front of each of the two slides 485 are normally positioned forwardly of their respective keys 256 at distances which are greater than the distances between the stems of successive keys 256 in the key-rows 13 and 16. Thus, each of the stops 486 for the second, third, fourth and fifth keys from the front of each of the key-rows 13 and 16, in moving rearwardly into contact with the stem of its respective key 256, must pass the stem of the next key forwardly in the same key-row. To avoid interference of the stems of the first, second, third and fourth keys 256 in each of the key-rows 13 and 16 with the stops 486 for the second, third, fourth and fifth keys in the same key-row, the lower ends of the stems of the first and third keys 256 at the front of each key-row 13 and 16 are cut away at the right side of the notch receiving the spring 266, the stops 486 for the first, third and fifth keys are offset leftward from the stop slides 485 for these two key-rows to place those stops 486 in alignment with the end portions of the key stems at the left of the notches receiving the springs 266, and the lower end portions of the stems of the second and fourth keys at the left of the notches receiving the springs 266 are cut away.

For the key-row 14—15 (Fig. 12), there are two differential stop slides 487 and 488. The stop slide 487 for the order 14 is beneath the key stems of the row 14—15 at the right side of the spring 266 and is the same as the stop slides 485 for the key-rows 13 and 16 except that stops 486 for the first three keys of the key-row 14—15 are not present on the stop slide 487 which, therefore, has stops 486 for only the rear nine keys of the key-row. Also, the upper front portion of the slide 487 extends forwardly only sufficiently to obtain support and guidance on the comb plate 39 throughout the full rearward movement of the stop slide. To avoid interference of the stem of the third key of the row 14—15 with the stop 486 for the fourth key of the row and interference of the stem of the fourth key with the stop 486 for the fifth key, the lower ends of the stems of the third and fourth keys in the row 14—15 are cut away at the right and left sides, respectively, of the notch for the spring 266 and the stop 486 for the fifth key of the row is offset to the left side of the slide 487.

The stop slide 488 for the order 15 has stops 486 for only the first three keys 256 of the key-row 14—15 and these three stops 486 are so positioned on stop slide 488 that, in the normal forward position of the latter, they are spaced ahead of the stems of the first three keys, respectively, the same distances at which the fifth, sixth and seventh stops 486 of the slides 485 for the key-rows 13 and 16 are spaced forwardly of the fifth, sixth and seventh keys, respectively, of the latter key-rows. Though none of the three stops 486 of the slide 488 is offset laterally from the body of that slide, no one of the stems of the first three keys of the row 14—15 can interfere with the stop 486 for any other key of that row.

Figure 3:
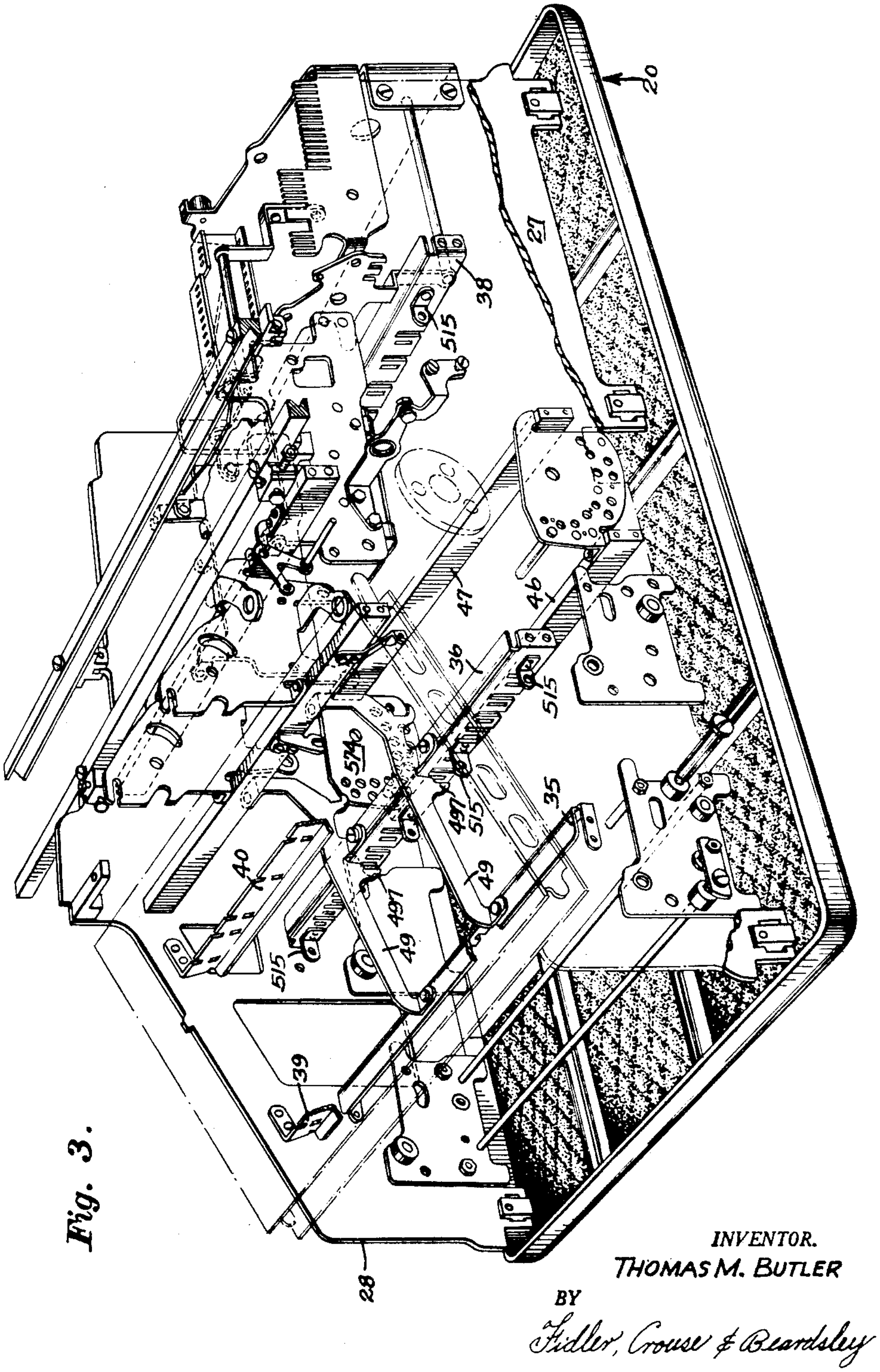
Fig. 3 is a perspective of the frame of the machine supported on its base pan or base portion of its casing with the right side frame member and keyboard frame portions removed but indicated by dot-dash lines to more clearly reveal interior elements of the frame, the assembly being viewed from a point above, forwardly and to the right.
Figure 4:
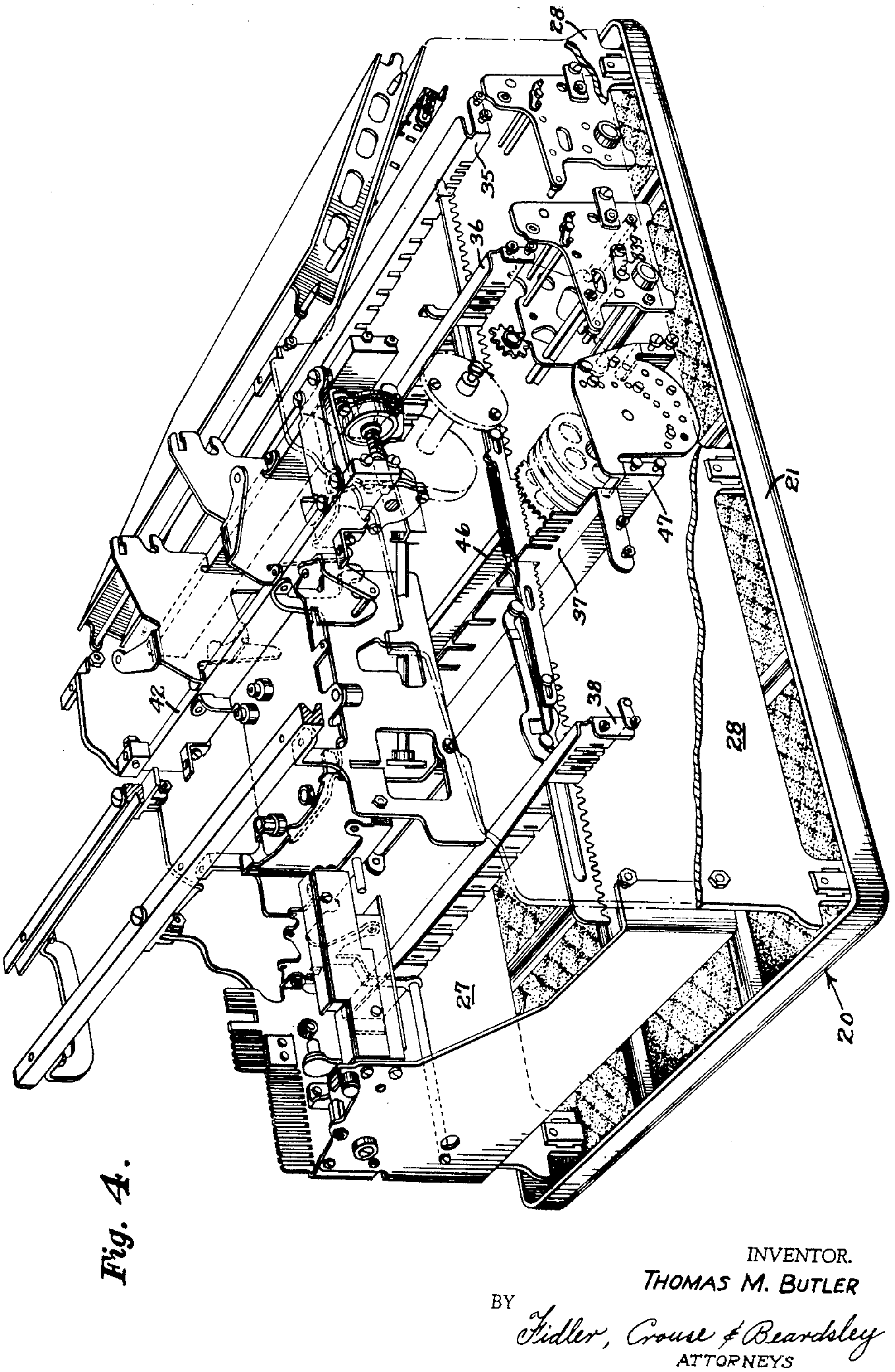
Fig. 4 is another perspective view of the machine frame and base pan as viewed from a point above, leftward and rearward thereof with the keyboard frame elements and right side frame member shown in full lines and some additional elements added, but with the left frame side member mostly broken away but indicated in dot-dash lines.

Each differential stop slide 483 carries a stud 489 (Figs. 14 and 16) engaging in a slot in an arm 490 of a differential stop sector 491. The two differential stop slides 485 (Figs. 11 and 13) for the key-rows 13 and 16 and the slides 487 and 488 (Fig. 12) for the key-row 14—15 are similarly connected with stop sectors 492, 493, 494 and 495 respectively. The stop sectors 491, 492, 493, 494 and 495 are rockably supported on a shaft 496 which is supported at its opposite ends in the side plates 27 and 28 of the machine frame and is braced against lugs 497 depending from brace members 49 (Figs. 3 and 19). The differential stop slides 483, 485, 487 and 488 and differential stop sectors 491, 492, 493, 494 and 495 are normally held in the position of Fig. 14 by engagement of the rear ends of the stop slides against a bail rod 498 supported by three arms

499 secured on a shaft 500 which is journalled at its ends in the side plates 27 and 28 of the machine frame. The differential stop slides 483, 485, 487 and 488 are urged rearwardly against the bail 498 by tension springs 501 connected between the upper ends of the respective arms 490 and a rod 502 which is supported in the arms 499. A three-armed lever 503 (Figs. 14 and 22) rockably supported on the shaft 500 has one of its arms connected by an eccentrically adjustable stud 504 to one of the arms 499. The other two arms of the three-armed lever 503 carry roller studs 505 and 506 which engage the edges of complementary cams 507 and 508, respectively, secured on the main drive shaft 126.

The cams 507 and 508 acting on the rollers 505 and 506 rock the bail 498 rearwardly from about the 22° point to about the 90° point in each revolution of the main drive shaft 126, hold the bail in its rearward position until about the 122° point and then return the bail to its normal position of Fig. 14 from about the 122° point to about the 190° point in the revolution of the drive shaft, as indicated by the line 483, 485, 487, 488, 498 in Fig. 32. Upon the rearward rocking of the bail rod 498, the slides 483, 485, 487 and 488 are drawn rearwardly and the differential stop sectors 491, 492, 493, 494, and 495 are rocked clockwise from their normal positions through the springs 501. In any key-row 1 to 11, 13, 14—15 or 16 in which a key 255 or 256 is in depressed position, the lower end of the stem of the depressed key will be engaged by the corresponding stop 484 or 486 on the associated slide 483, 485, 487 or 488 to arrest the slide and the connected sector 491, 492, 493, 494, or 495 in a differential position appropriate to the particular key which is depressed in the key-row.

Each differential stop sector 491, 492, 493, 494 and 495 has a series of spaced stop shoulders 509 adapted to cooperate with a lateral lug 510 on the respective one of a series of actuator racks 511 and 512 forwardly and rearwardly slidably supported on individual bushings 513 (Fig. 18) carried on two rods 514 supported in front of the comb members 36 and 38 in the side plates 27 and 28 of the machine frame and in a plurality of small angle brackets 515 riveted to the front sides of the comb members 36 and 38. Each of the bushings 513 has an annular flange 516 engaged in a respective one of a series of vertical slots 517 formed in the front portions of the comb members 36 and 38 whereby the bushings 513 are held in the proper positions lengthwise of the rods 514. The actuators 511 and 512 are guided in spaced parallel relation in slots 518 in the comb members 35, 36, 37 and 38.

Each stop sector 491 has ten stop shoulders 509 which are spaced at uniformly increasing distances from the axis of the shaft 496, the one nearest the shaft 496 being brought into the path of the lug 510 of the associated actuator 511 when the associated stop slide 483 moves through its maximum stroke while no key is depressed in the associated row of keys 255. The stops 509 which are successively farther from the axis of the shaft 496 are positioned in the path of the lug 510 when the strokes of the stop slides 483 are limited by the stems of amount keys 255 of successively higher values from "1" to "9" in the associated key-row, and each permits movement of the actuator 511 to an extent exactly proportional to the digital value of the depressed key. The stop sectors 492, 493 and 494 each have twelve shoulders 509 arranged at progressively uniformly increasing distances from the axis of the shaft 496, the rearmost shoulder being adapted, when in the path of the lug 510 of the associated actuator 511 to prevent any significant movement of that actuator, and the foremost one of the twelve shoulders being adapted, when in the path of the lug 510, to permit slightly greater movement of the associated actuator than is permitted by the foremost shoulder 509 on a sector 491. The stop sector 495 has eight shoulders 509 corresponding to the rear eight shoulders 509 of the sector 494 but only the front three shoulders 509 on the sector 495 are functional.

The eleven actuator racks 511 are associated with the key-rows 1 to 11 and have, on their lower edges, rack teeth to cooperate with the pinions of registering mechanisms or totalizers disclosed in detail in my application Ser. No. 174,696. The four actuator racks 512 for the orders 13-16 associated with the key-rows 13, 14—15 and 16, which are provided for setting up data other than the amounts to be entered into for the registering mechanisms do not have such rack teeth.

The totalizers of the disclosed machine, as previously mentioned, have not only a numerical order 1 to 11 for each of the amount key-rows 1 to 11, but also have an extra, higher or overflow order 12. An actuator rack 519 (Figs. 7, 13, 14 and 22) is provided for the order 12, this actuator being located between the actuator 511 for the order 11 and the actuator 512 for the order 13 and supported and guided in the same manner as the actuators 511 and 512 as previously described. The actuator rack 519 like the racks 511, has on its lower edge, rack teeth to cooperate with totalizer pinions. For the actuator rack 519 there is no stop sector and no stop slide. The actuator rack 519 has at its forward end a stud 520 which is normally engaged by a stop 521 which prevents forward movement of this actuator rack during machine operations other than total-taking and subtotal-taking operations, as will be explained hereinafter.

Figure 11:
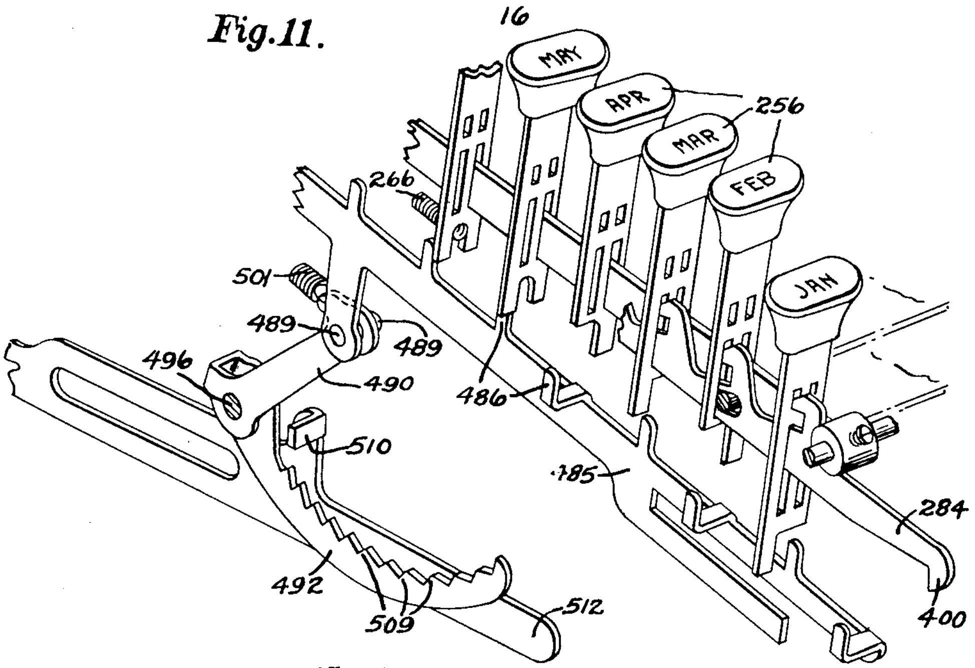
Figs. 11, 12 and 13 are detail perspectives of portions of the differential stop mechanism and key latching means associated with three rows of date keys.
Figure 12:
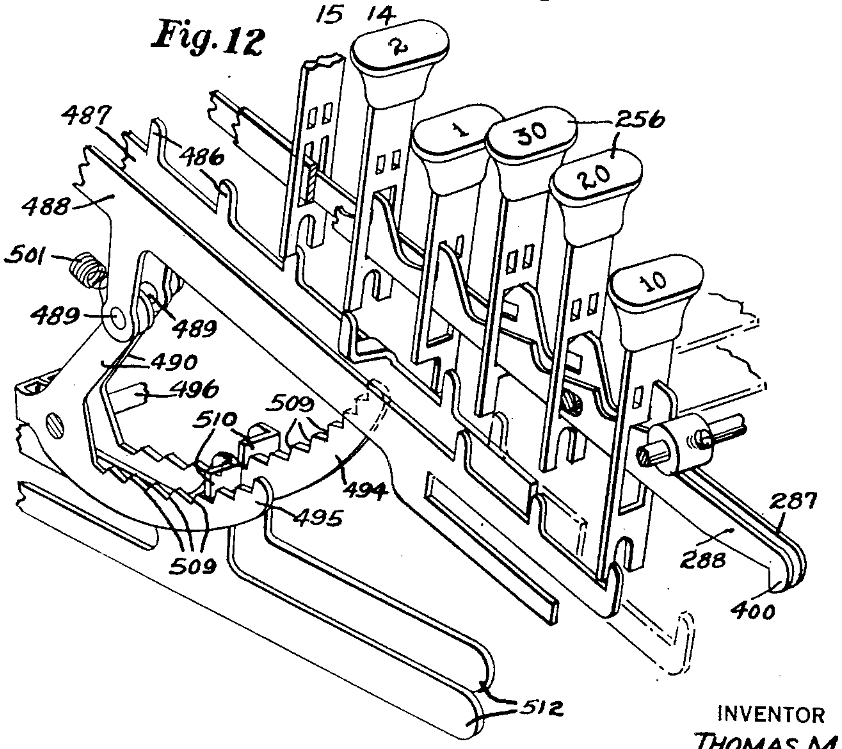
Figure 13:
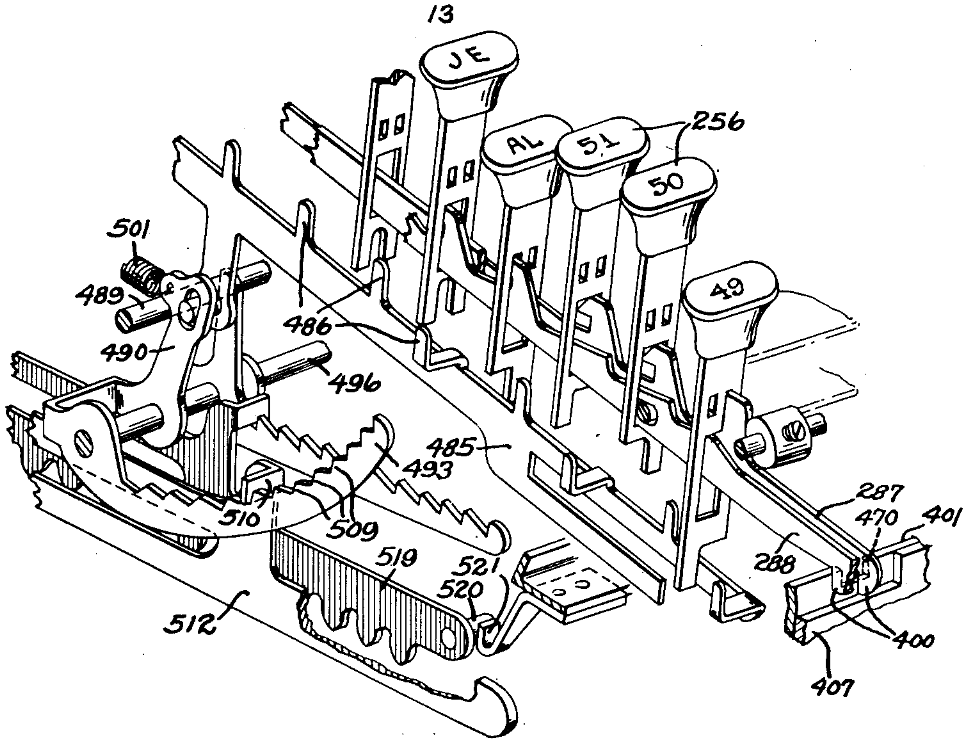

The four actuator racks 512 for the orders 13 to 16 are grouped closely together immediately to the left of the actuator rack 519, the latter rack being under the key-row 13. This leaves, under the key-row 16, space for other elements of the machine which would otherwise require extra width of the machine frame and case. To obtain such location of the four actuator racks 512, the stop sectors 492, 493, 494 and 495 for these four actuators are formed and arranged as shown in Figs. 11, 12 and 13.

Each differential stop sector 491, 492, 493, 494 and 495 is formed as a yoke member, both sides of which have rotatable bearing on the shaft 496. The upward arm 490 and the forward stop arm of each sector 491 are on the left side of the yoke, the right side of the yoke serving merely to prevent lateral wobbling of the sector and, in cooperation with elements described later, to accurately space and position the sector along the shaft 496. The sector 493 (Fig. 13) for the order 13 has its arm 490 on the right side of the yoke, which is somewhat wider, lengthwise of the shaft 496, than the yokes of the other sectors. Also, the stud 489 on the stop slide 485 for the key-row 13 projects from the left side of that stop slide so that the arm 490 of the stop sector 493 may be positioned to the left of the associated stop slide 485. The actuator rack 512 for the order 13 can thus be located somewhat to the left of the key-row 13.

The actuators 511 for the orders 1 to 11 are at the left of the stop arms of the sectors 491 for those orders and the lug 510 of each of the actuators 511 as well as the lug 510 of the actuator 519 extends toward the right, whereas the four actuators 512 are to the right of the stop arms of the associated sectors 492, 493, 494 and 495 and their lugs 510 are turned leftward. The stop sector 492 (Fig. 11) for the order 16 has its arm 490 on the left side and its forward stop arm on the right side of its yoke portion so that the actuator 512 for the order 16 can be located considerably to the right of the key-row 16.

The two actuators 512 for the orders 14 and 15 (Fig. 12) are each a little to the right of their respective stop slides 487 and 488 because of the two actuators 512 being located at the right sides of the forward stop arms of their respective stop sectors 494 and 495.

Because of the shortening of the forward stop arm of the stop sector 495 (Fig. 12) for the order 15, it cannot strike the stop slide 487 for the order 14 when the machine is operated without any of the front three keys of the key-row 14—15 being depressed.

The previously described positioning of the three stops 486 on the stop slide 488 for the order 15 is such that the foremost three stop shoulders 509 on the shortened stop arm of the stop sector 495 are allotted to the front three keys of the key-row 14—15.

Each actuator 511, 512 and 519 carries three studs 522 (Fig. 14) on which is slidingly mounted a plate 523 formed with slots receiving the studs 522 and permitting limited forward and rearward movement of the slide plate 523 relative to the actuator. Each slide plate 523 carries a stud 524 on which is pivotally mounted a coupling pawl 525 formed in its rear end portion with a cam slot 526 (Fig. 15) in which engages a headed stud 527 fixed in the actuator. Forwardly of the cam slot 526, the coupling pawl 525 has a slot 528 having a forwardly open horizontal portion connecting rearwardly with a vertical portion behind a shoulder 529 on the pawl 525. A tension spring 530 is so connected between each actuator 511, 512 or 519 and its respective slide 523 as normally to hold the slide 523 at the rearward limit of its movement on the actuator in which position of the parts the stud 527 on the actuator is in the upper forward portion of the cam slot 526 in the rear end of the pawl 525, so that the rear end of said pawl occupies the lower position illustrated in Figs. 14 and 15.

While the parts are in normal position with the machine at rest, a bail rod 531 (Figs. 14 to 17, 19, 21 and 22) extending transversely above all of the actuator racks is engaged in the vertical portion of the slot 528 in each of the connecting pawls 525 and between the rearwardly facing shoulder 529 of the pawl 525 and a small concavity in the forward face of a shoulder 532 on the upper side of the actuator. Each actuator 511, 512 and 519 is urged forwardly by a tension spring 533 which is connected at its rear end to a stud on the actuator and at its forward end to the comb plate 36. The spring 533 also tends to hold the shoulder 532 on the actuator in engagement with the rear of the bail rod 531.

The ends of the bail rod 531 (Figs. 19 and 22) are guided in horizontal slots 534 in guide plates 535 which, at their rear ends, are rockably supported between spacing sleeves on a rod 536 having reduced threaded ends passing through and supported in the frame side plates 27 and 28. A nut threaded on the rightward end of the rod 536 inside of the plate 27 and against the rightmost spacing sleeve, and a nut threaded on the left end of the rod on the outer side of the plate 28 secure the rod and spacing sleeves to the plate 28. The forward ends of the guide plates 535 have openings slightly elongated forwardly and rearwardly and supported on eccentric bushings 537 located between spacing sleeves on a rod 538 mounted in the frame side plates 27 and 28 similarly to the rod 536. By rotary adjustment of the bushings 537 before tightening the nut on the left end of the rod 538 to secure the rod and bushings against rotary and axial movement, the forward ends of the guide plates 535 may be raised or lowered. Just inwardly of the guide plates 535, the ends of the bail rod 531 extend through eccentric bushings 539 (Fig. 21) rotatably adjustably secured, as by headed screws, in links 540, the forward ends of which are pivotally connected to the lower ends of levers 541 (see also Figs. 14 and 16) pivoted on studs 542 supported by the side frame plates 27 and 28 respectively. Each lever 541 also carries rollers 543 and 544 which cooperate respectively with cam plates 545 and 546. Both cams 545 and 546 of each pair are secured to a single hub, the two hubs for the two pairs of cams being secured to the main drive shaft 126 just inwardly of the respective side plates 27 and 28.

The formation and arrangement of the cam plates 545 and 546, the rollers 543 and 544 and the levers 541 are such that, from about the 90° point to about the 165° point in each rotation of the main drive shaft 126, the bail rod 531 is drawn forwardly after the differential stop slides 483, 485, 487 and 488 and the differential stop sectors 491, 492, 493, 494 and 495 have been moved to the differential positions corresponding to the depressed keys. Each spring 533 maintains the shoulder 532 of the associated actuator 511, 512 or 519 against the bail rod 531 in the forward movement of the latter until the actuator is arrested, whereupon the bail rod 531 acts against the shoulder 529 of the associated pawl 525 and moves the pawl 525 and thus also the slide 523 further forwardly relative to the arrested actuator rack, the spring 530 yielding. Any tendency for an actuator 511, 512 or 519 to be stopped by any minor resistance before it is arrested by a firm stop such as a shoulder 509 on a sector 491, 492, 493, 494 or 495, is overcome by the extra thrust imparted to it through the spring 530 when the bail rod 531 acts against the shoulder 529 of the associated pawl 525.

During the forward movement of the slide 523 relative to the arrested actuator rack, the stud 527 on the actuator rack shifts into the rearward lower portion of the cam slot 526 in the pawl 525, thus raising the rearward end of the pawl 525 and moving the shoulder 529 substantially above the center of the bail rod 531. By this raising of the rearward end of the pawl 525, a stud 547 on the rearward end thereof is elevated into a notch in a series of notches 548 in a locking comb plate 549, there being one such notched plate 549 for each actuator 511, 512 and 519. The plates 549 are supported at their forward and rearward ends between spacing sleeves on the rods 536 and 538. Near its forward end, each plate 549 has a downwardly extending lug 550 with a leftwardly bent end overlying the upper edge of the associated actuator 511, 512 or 519.

The particular one of the notches 548 into which the stud 547 is lifted is determined by the position in which the actuator is arrested, in item entering operations, by encounter of its lugs 510 with a stop shoulder 509 of the corresponding stop sector, this in turn being determined by the position of the stop sector in accordance with the particular key, if any, which is depressed in the corresponding key-row. If any stop slide 483, 485, 487 or 488 is not arrested by the stem of a depressed key (no key for that stop slide being depressed), the stop slide moves to the rearward limit of its movement and positions the rearmost stop shoulder 509 on the connected sector 491, 492, 493, 494 or 495 to engage and arrest the lug 510 of the associated actuator 511 or 512 which then causes the stud 547 on the connected pawl 525 to enter the rearmost notch 548 of the associated plate 549. In item entering operations, the stop 521 engaging the stud 520 on the actuator 519 holds that actuator in its normal position.

In total-taking operations, the actuators 511 and 519 are arrested, in their forward movement, under control of the engaged totalizer pinions, as described in my application Ser. No. 174,696, and the actuators 512 may be governed by depressed keys 256 the same as in item entering cycles. The locking plates 549 for the orders 1 to 12 each have ten notches 548 and the plates 549 for the four actuators 512 for the orders 13 to 16 each have thirteen notches 548.

During continuing forward movement of the bail 531 toward the forward limit of its movement, the bail acts on the edge of the shoulder 529 to cam the rear end of the pawl 525 still further upwardly to engage the stud 547 higher in the notch 548 in the plate 549 and to engage the stud 527 in the vertical rear end portion of the cam slot 526, so that as the bail 531 moves under the shoulder 529 into the horizontal portion of the slot 528 or forwardly thereof, the stud 527 in the vertical portion of the slot 526 positively locks the actuator 511, 512 or 519 to the pawl 525 and slide 523 and the stud 547 in the notch 548 positively locks the pawl 525 and the slide 523 and thus also the actuator 511, 512 or 519 in differential position and prevents rebound of the actuator while the bail 531 is free to move to the forward limit of its movement.

The formation and arrangement of the cams 507 and 508, the rollers 505 and 506, and the lever 503 are such that the bail 498 is again moved forwardly from about the 122° point to about the 190° point in the rotation of the shaft 126 to restore the differential stop slides 483, 485, 487 and 488 and sectors 491, 492, 493, 494 and 495 to their normal positions after all of the actuators 511, 512 and 519 have been moved to and locked in their differential positions. Also, slightly before the restoration of the differential stop slides 483, 485, 487 and 488 and stop sectors 491, 492, 493, 494 and 495 has been completed, the depressed keys 255 and 256 are restored at about the 189° point in the cycle, as previously stated, to permit the operator to utilize the remainder of the machine cycle for setting up the next entry on the keyboard.

From about the 189° point to about the 263° point in the machine cycle, after the operation of the printing mechanism as described in my application Ser. No. 174,696 and after the actuators 511 for the orders 1 to 12 have been in their differential positions long enough to permit engagement of the desired totalizer or totalizers with those actuators in adding operations or the disengagement of the totalizers from those actuators in subtracting and total-taking operations as also described in my application Ser. No. 174,696, the cams 545 and 546 act on the rollers 543 and 544 to restore the levers 541, the links 540 and the bail 531 rearwardly to their normal positions. After the bail 531 re-enters the slot 528 in a pawl 525 and as it reaches a position under and slightly rearward of the shoulder 529 of said pawl, the bail encounters an upwardly and rearwardly inclined cam edge 551 of the slot 528 and cams the rear end of the pawl 525 downwardly to disengage the vertical portion of the cam slot 526 from the stud 527 on the actuator and lowers the stud 547 in the notch 548 in the plate 549. The spring 533 still urges the actuator forwardly and the spring 530 urges the slide 523 and pawl 525 rearwardly relatively to the actuator.

During the continued rearward movement of the bail 531 as the stud 527 moves in the inclined portion of the slot 526, the rear end of the pawl 525 moves downwardly to complete the disengagement of the stud 547 from the notch 548 and to re-engage the bail 531 in the upper vertical portion of the slot 528 rearwardly of the shoulder 529 and against the shoulder 532. The pawl 525, slide 523 and the actuator are thus unlocked so that they may be positively restored to their normal positions by the bail 531 as shown in Fig. 14.

At the time of disengagement of the stud 547 from the notch 548 and disengagement of the stud 527 from the vertical rear end portion of the slot 526, the springs 533 and 530 could, in the absence of provision to prevent it, cause a short, sudden movement of the actuator forwardly beyond the differential position corresponding to the depressed key. If a totalizer were engaged with the actuators 511 and 519 at that time, such movement of the actuators might result in inaccuracies in the operation of the totalizer. To avoid such undesirable forward movements of the actuators 511 and 519 as they are unlocked from their differential positions, ratchet arms 552 (Figs. 13, 14, 16 and 22) are pivotally mounted on the shaft 496, there being one such ratchet arm for each actuator 511 and 519.

Each ratchet arm 552 is normally urged clockwise by a tension spring 553 connected at its rear end to a downward projection of the arm 552 and at its forward end to the comb member 35. Each ratchet arm 552 has an upwardly extending finger 554 adapted to cooperate with a cross rod of a bail 555 pivotally supported on the shaft 496. At its left end, the cross rod of the bail 555 is connected by a link 556 to a lever 557 which is pivoted on a stud 558 secured in the frame side plate 28. The lever 557 is urged clockwise by a tension spring 559 connected at its upper end to the lever 557 and at its lower end to a rod 583 described hereinafter. The left cam plate 546 carries a roller stud 560 adapted to engage and rock the lever 557 counterclockwise against the tension of its spring 559 to move the bail 555 forwardly from its normal position of Fig. 16 to the position shown in Fig. 18 to remove the teeth of the ratchet arms 552 from the paths of the lugs 510 of the actuators 511 and 519 prior to the forward movement of the actuators in the machine cycle, as indicated by the line 552 in Fig. 34.

When the bail 531 has reached the forward end of its movement and all the actuators are locked in their differential positions, the roller stud 560 moves away from the end of the lever 557 and permits the spring 559 to rock said levers and the bail 555 clockwise from the position of Fig. 16 to the position of Fig. 14. The springs 553 return the ratchet arms 552 to their normal positions so that their teeth are re-engaged with the lugs 510 of the actuators 511 and 519 and remain so engaged throughout the remainder of the machine cycle, thus preventing any undesired forward movements of the actuators 511 and 519 by the springs 533 and 530 when the actuators are unlocked from the notched plates 549. As the actuators 512 do not cooperate with any totalizer pinions, there is no need to provide ratchet arms 552 for those actuators.

The cams 545 and 546 and the parts through which those cams move the bail 531 are so designed that in its normal rearward position, the bail 531, engaging the shoulders 532 on the actuator racks, holds the latter in their normal rearward positions as shown in Fig. 14. In moving to the forward limit of its stroke during a machine cycle, the bail 531 moves sufficiently farther forward, after the arrest of any actuator 511, 512 or 519 permitted to move to its foremost position, that the stud 547 on the coupling pawl 525 on such actuator is moved upward into the foremost notch 548 in the corresponding notched plate 549 and the bail rod 531 moves under the shoulder 529 of the coupling pawl 525. The actuator 512 for the order 15 is never permitted to move to its frontmost position but such movement of the remaining actuators 511 and 512 may occur in cycles during which the rearmost keys 255 or 256 in the corresponding key-rows are depressed, and such movement of the actuators 511 and 519 may occur in total-taking cycles in orders in which 9's appear in the totals.

*Printing mechanism*

The machine has a printing mechanism shown and described in detail in my application Ser. No. 174,696 and including printing types 561 (Figs. 14, 16, 19, 28 and 29) carried on a series of vertically movable type bars 562 guided in upper and lower comb plates 563 and 564 secured by headed screws upon the upper sides of the frame cross-member 42 and the cross-members 47, respectively. The type bars 562 are held in the upper comb plate 563 by a retaining strip 565, the rearward portion of which is secured between the comb plate 563 and the member 42 by the same screws which secure the comb plate 563 to the member 42. The retaining strip 565 has, between its front and rear edge portions, a slot through which all the type bars 562 pass, and has its forward portion turned down to engage flatly against the forward edges of the type bars. There is one type bar 562 for each of the orders 1 to 18 of the machine, that is, one type bar 562 for each of the actuator racks 511, 519 and 512, and one type bar 562 for each of the key-rows 17 and 18 but none for the motor bar row 19. In Fig. 29, each type bar 562 is also designated by the reference numerals 1 to 18 by which the corresponding orders have been designated in other mechanisms of the machine.

The type bars 562 are arranged in a relatively closely spaced group in about the central portion of the machine with their lower portions extending downwardly through spaces (Figs. 23 and 29) between certain of the actuator racks 511 and slides 523. The arrangement of the parts is shown in Fig. 28 as viewed from a position in front of the type bars. The upper type carrying portions of the entire series of type bars are substantially uniformly laterally spaced, the lower portions of some of the type bars being laterally offset relative to the upper portions thereof to clear those racks 511 and slides 523 which extend forwardly and rearwardly through the region between the two outermost type bars.

*Indexing of type bars*

The lower edges of the slides 523 carried by all the actuators 511, 512 and 519 and the lower portion of the front edge of each type bar 562 are formed with rack teeth, and each rack slide 523 is geared to a respective one of the type bars 562 of the orders 1 to 16 through an individual gear train. All of such gear trains are incorporated in a gear cluster assembly shown in Figs. 23 to 26, inclusive. Each such gear train comprises a gear 566 which meshes with the rack teeth on a respective one of the slides 523 and with an individual pinion 567. It also comprises a gear 568 which meshes with an individual pinion 569 and with the rack teeth on a respective one of the type bars 562 which it holds in its guide slot in the comb plate 563. The hubs of the two pinions 567 and 569 of each gear train are both pinned to the same individual one of a series of shafts 570, except in the gear train connecting the first type bar 562 at the left with the rack slide 523 on the actuator rack 512 for the order 16. In the latter gear train, the pinion 567 is rotatably supported on the shaft 570 of the gear train for the order 10 between spring clips engaged in annular grooves in the shaft. The last-mentioned pinion 567 meshes with a pinion 571 fixed on a hub pinned on a shaft 572 to which the hub of a pinion 573 is also pinned. The pinion 569 of this same gear train meshes with the pinion 573 and is rotatably supported on the last-mentioned shaft 570 between one of the hereinafter-described frame members 574 of the assembly and a spacing sleeve 575 abutting against the hub of the pinion 569 of the gear train for the order 10.

The frame of the gear cluster assembly comprises a plurality of vertical frame plates 574 secured in lateral, spaced relation on the two cross-members 46 and 47. The gears 566 and 568 are rotatably supported in proper spaced relation on the reduced ends of spacing sleeves 576 which are assembled on sleeves 577 between nuts 578 threaded on the ends of the sleeves 577. The sleeves 577 are supported between the plates 574 on a rod 579 extending from end to end of the assembly and supported in apertures in the several plates 574. The gears 566 and 568 and sleeves 576 are assembled in subgroups on the sleeves 577, which not only facilitates assembly but also facilitates alignment of the gears 566 and 568 with their respective actuators 511, 512 and 519 and with the type bars 562 by adjustment of the nuts 578 which position the sleeves 576 on the sleeves 577, the latter sleeves being definitely positioned on the rod 579 by the plates 574. After the rod 579 has been passed through all of the sleeves 577, spring clips 580 (Fig. 29) are snapped into annular grooves on the ends of the rod 579 just outside of the two end plates 574 of the assembly to secure the rod 579 against endwise movement.

The shafts 570 are positioned around the periphery of the gears 566 and 568, each shaft 570 being journalled in one of the outer two of the plates 574 and in the adjacent one of the inner plates 574 and extending inwardly of the latter far enough to properly position its pinions 567 and 569.

The particular arrangement of the pinions 567 and 569 and shafts 570 employed in the illustrated machine is shown in Fig. 23, but it will be apparent that various other arrangements may be employed, it being necessary only that the gears 566 and 568 and the pinions 567 and 569 and the shafts 570 shall serve to connect each of the racks 511, 512 and 519 with the type bar 562 for the corresponding order.

After the shafts 570 and 572 with their pinions 567, 569, 571 and 573 have been placed in the assembly, an arcuate key member 581 (Fig. 24) is inserted in annular grooves formed in the shafts 570 and grooves in a plurality of studs 582 secured on the inner sides of the end plates 574 to hold the shafts 570 against endwise movement. The left-hand key plate 581 also engages in a groove in the shaft 572 to hold the latter shaft against endwise movement. After the key plates 581 are in place, a transverse tie rod 583 is passed through aligned openings in the plates 574 and through a notch in each of the key plates 581, whereby the latter are held against displacement. The tie rod 583 and a second tie rod 584 are suitably secured to the end plates 574, as by means of screws.

In each machine operation in which any of the actuators 511, 512 or 519 are moved forwardly to different positions, the type bars 562 for the corresponding orders are raised, by means of the above-described gear trains, to position the appropriate type thereon at the printing line in front of the platen on the traveling paper carriage and are again lowered to normal position as the actuators 511, 512 and 519 are returned to normal position.

As previously described, the bail 531 causes each connecting pawl 525 and the connected rack slide 523 to move forward a predetermined short distance after the associated actuator 511, 512 or 519 has been arrested and similarly causes a corresponding short forward movement of the connecting pawl 525 and rack slide 523 associated with any actuator 511, 512 or 519 which is held immovable in its normal position during a machine cycle. Consequently, each of the type bars 562 for the orders 1 to 16 will be elevated a predetermined short distance in addition to a distance proportional to the amount of movement, if any, permitted the corresponding actuators in any machine cycle. This predetermined short distance to which each type bar 562 is elevated beyond the distance proportional to the amount of movement permitted the corresponding actuator is equal to the distance between the printing line and the uppermost type position on each type bar 562 when the latter is in its normal position. Thus in any machine cycle in which any actuator 511, 512 or 519 is not permitted any forward movement, the associated type bar 562 will be elevated to bring the uppermost type position thereon to the printing line. The types are spaced vertically on each type bar at distances corresponding to the additional lifting of each type bar resulting from each step of forward movement of the corresponding actuator under control of the stop sector 491, 492, 493, 494 or 495.

It will be noted that to the right of the type bar 562 for the order 1, there are two more type bars 562 for symbol printing associated with the orders 17 and 18. Gears 568, pinions 569 and shafts 570 are provided also for these two type bars 562. The two shafts 570 for the orders 17 and 18 extend through the right end plate 574 of the gear assembly and below the right-hand side plate 27 of the machine frame, and each has a pinion 585 secured on its right-hand outer end. The pinions 585 are rotated by means controlled by the means controlling the performance of the computing functions of the totalizers as disclosed in detail in my application Ser. No. 174,696.

The types 561 which are at the printing line are driven toward the platen to produce a printing impression by printing hammers 605 (Fig. 14) which, as disclosed in my application Ser. No. 174,696, are driven against those types at about the 168° point in the machine cycle while the actuators 511, 512 and 519, and thus also the type bars 562 for the orders 1 to 16 are locked stationary in indexed position, and the type bars 562 for the orders 17 and 18 are also stationary in their indexed positions.

*Operation of differential mechanism in total-taking*

Whereas, in amount-entering operations, the actuator rack 519 and all of the actuator racks 511 of orders in which no keys 255 are depressed are held in their normal "0" positions and the remaining actuators 511 are arrested in positions determined by depressed keys 255, as previously described, provision is made to permit all of the actuators 511 and 519, during the taking of a total or subtotal from either of the totalizers of the machine, to move forwardly to the full extent required to zeroize the totalizer regardless of whether or not any keys 255 are depressed.

A link 948 (Figs. 30 and 31) has two forwardly and rearwardly elongated slots which, respectively, receive studs 943 and 993 on arms 944 and 992 which are connected with pivotally mounted yokes 945 and 989 which are elements of the total-taking and subtotal-taking control means for the two totalizers of the machine. As disclosed in detail in my application Ser. No. 174,696, the stud 943 and link 948 are moved rearwardly whenever the front totalizer controls are conditioned for total-taking or subtotal-taking and the stud 993 and link 948 are moved rearwardly whenever the rear totalizer controls are conditioned for total-taking or subtotal-taking. The link is also formed at its forward end with a slot embracing a stud 950 secured in an intermediate portion of a link 951 is pivotally mounted at its lower end on a stud 952 carried by the rearward arm of a yoke 953 which is pivotally supported on a stud 954 secured in the plate 27.

The lower end of a spring 415 is connected to the rearward arm of the yoke 953 to urge the latter counterclockwise and the link 951 upwardly so as to normally maintain a roller 955, which is rotatably carried by the stud 952, in engagement with the lower edge of the forward end of a slide 956 which is moved forwardly between about the 20° and 35° points and returned rearwardly after the 340° in each machine cycle.

The upper portion of the link 951 has a leftwardly turned lug 963 which, when the link 948 is pulled rearwardly in its total-taking and subtotal-taking position, is positioned above a stud 964 (Figs. 30 and 31) extending rightwardly through an aperture in the frame plate 27 from a forward extension of the right-hand side of a bail 965 (Figs. 31 and 14) the right and left side arms of which carry studs 966 journalled in the side plates 27 and 28. A tension spring 967 (Fig. 31) connected at its lower end in an eye in the forward end of the right side arm of the bail 965 and at its upper end to a stud 414 secured in the plate 27, normally holds the bail in a clockwise position where the stud 964 limits against the upper edge of the slot in the frame plate 27. At the rear ends of the side arms, the bail 965 has a cross piece which carries the stop member 521 and has an upturned rear edge 968 normally positioned just below and rearward of projections 969 on each of the stop slides 483.

In any machine cycle in which the lug 963 is over the stud 964, as the slide 956 moves forwardly, a cam portion 970 of the lower edge of the latter moves over and depresses the roller 955 to lower the link 951 which in turn depresses the stud 964 to raise the stop 521 above the stud 520 on the actuator rack 519 for the order 12 and raise the upturned rear edge 968 of the bail 965 in back of the projections 969 prior to the 22° point in the machine cycle whereby the stop slides 483 are prevented from moving rearwardly during that machine cycle. Consequently, the stop sectors 491 are held in their normal positions during tha machine cycle and the actuator racks 511 and 519 are permitted to move as far forwardly as required for and permitted by the rotation of the crossfooter pinions to their "0" positions.

Through the connections previously described, the type bars 562 for the orders 1 to 12 are moved to place at the printing line the type corresponding to the total thus taken from the crossfooter pinions by the actuator racks 511 and 519. As the slide 956 returns to normal after the 340° point, the link 951 and bail 965 are also returned to normal by the springs 415 and 967. The link 948 is returned to normal by the spring 949 when the operated total-taking or subtotal-taking controls, including the stud 943 or 993, are returned to normal.

From the foregoing it will be seen that the present invention provides a reliably, accurately and rapidly operating differential mechanism in which differential stop means are movable, in the early portion of each item-entering machine cycle, to positions determined by depressed keys and then arrest the differential actuators in appropriate differential positions, and wherein the differential actuators when arrested, are locked in accurate differential positions independently of the differential stop means which can then quickly be returned to normal so that the keyboard of the machine may be quickly restored to normal and thus conditioned for the setting up of a new item during a very large part of the last half of the machine cycle. The means conditioned by the total-taking and subtotal-taking control means to retain the differential stop means in normal position where it does not limit movement of the differential actuators, permits the taking of totals and subtotals while items are set up on the the keyboard. The machine of the present application can be controlled automatically to take totals and subtotals while keys 255 are in depressed condition but, as disclosed in detail in my application Ser. No. 174,696, the shortness of the notches under latch hooks 332 for the total keys and the subtotal keys 315, 316, 321 and 322 on the function control key latch slides 329 and 330, prevents initiation of machine cycles in which both an amount key 255 and a total or subtotal key are depressed. However, as will be readily understood by those skilled in the art, such sometimes desirable hinderance to manually conditioned total-taking and subtotal-taking operations while amount keys are depressed is easily removed by merely forwardly lengthening the notches under the total and subtotal key latch hooks 332 on the function control key latch slides 329 and 330.

The increased productivity obtainable by utilizing a large part of the time during which the machine is performing a cycle of operation for setting on the keyboard an item which is to be entered into the calculating mechanism and/or printed in the next machine cycle will be immediately apparent. The performance of total-taking and subtotal-taking operations while amount keys are in depressed condition also increases productivity in different ways in different kinds of work. In kinds of work requiring the repeated entry of the same amount in amount entering operations which alternate with sub-totaling operations, the elimination of the need to manually set up the amount prior to each of the amount entering operations results in a large increase of productivity without requiring the use of an extra totalizer. In kinds of work requiring the production of duplicate original records of accounts, as in the production of original ledgers and statement of accounts receivable, paper carriage movemets are simplified and shortened and the time required for their execution is greatly shortened, and delays between cycles of operation of the machine are minimized. Figs. 33 and 34 show an example of the production of original ledgers and statements in accounts receivable posting with separate debit posting and credit posting runs. The manner of operation of the machine in performing the example of work shown in Figs. 33 and 34 is explained in detail in my application Ser. No. 174,696. For the present purposes, it will be sufficient to point out that the operator can begin setting up on the keyboard an item which is to be entered in the ledger "Charge" column as in Fig. 33 or in the ledger "Credit" column as in Fig. 34 at any time after about the 204° point of the previous machine cycle during which the date and number are printed in the "Date" column of the ledger. In the manually initiated item entering cycle in which the item is printed in the ledger "Charge" or "Credit" column, the paper carriage moves automatically directly to the ledger "Balance" column position whereupon the machine performs an automatically conditioned and automatically initiated subtotal-taking operation and prints the new balance in the ledger "Balance" column, after which the carriage automatically moves to the statement "Charge" or "Credit" column, as the case may be. In both of these item-entering and balance printing operations, a carriage-governed automatic control means moves the slide 403 leftwardly to place the lugs 406 out of alignment with the hooks 400 on the latch slides 275 for the amount keys 255 so that the debit or credit item remains set up on the keyboard when the carriage moves into the statement "Charge" or "Credit" position where that item is then printed in a further automatic cycle of operation of the machine. During this automatic repeat-item-printing operation, the slide 403 remains in its normal position with the lugs 406 aligned with the hooks 400 so that all depressed amount keys 255 are released and returned to normal. If that repeat-printed item is the only one to be posted or the last of a series to be posted to the same account, the previously mentioned manually initiated item entering operation will have been initiated in such manner that, during the automatic operation in which the item is printed in the statement "Charge" or "Credit" column, the carriage will move to the statement "Balance" column position where the balance is again printed in an automatically conditioned and initiated subtotaling operation in which the carriage tabulates to an old balance second pick up position. At any time following the 204° point in the last automatic balance printing operation, the operator may commence setting up the second pick-up of the previous old balance on the keyboard.

It will be seen that, in the illustrated example, original prints of an item and a new balance on both a ledger form and statement form are produced with three tabulating or short skip-tabulating carriage movements, whereas a larger skip-tabulation of the carriage from a ledger item column position to a statement item column position, then a return of the paper carriage to the ledger balance column position, and then another long skip-tabulation to the statement balance column position would be required if it had been necessary to print the item on both ledger and statement forms and to release and restore the amount keys to normal before printing the new balance on either form.

Advantages obtainable in other kinds of work will be readily apparent to those skilled in the art.

I claim:

1. A calculating machine having means to drive it through cycles of operation, a plurality of orders of depressible keys, a differential actuator member for each order of keys, a differential stop means for each order normally positioned to permit full movement of the differential actuator for the same order but operable early in a machine cycle to be positioned under control of the keys for said order to arrest the differential actuator member after a movement of the latter proportional to the value of a depressed one of said keys and to prevent movement of said actuator when no key in said order is depressed, a totalizer, means to operate said totalizer to engage it with and disengage it from said differential actuator members to cause amounts represented by depressed keys to be entered into said totalizer, total-taking control means to condition said operating means to operate said totalizer to cause a total to be taken from said totalizer by said differential actuator members, and means controlled by said total-taking control means and independent of said amount keys to keep said differential stop means in its normal position during machine cycles performed while said total-taking means is in total-taking condition regardless of the depressed or non-depressed condition of said amount keys.

2. A calculating machine having means to drive it through cycles of operation, amount indexing means, plural order differential actuator means, totalizer mechanism operable by said differential actuator means, and a printing mechanism including type bars indexed by said differential actuator means, said differential actuator means including a driving member driven from said driving means through a constant advance and return reciprocating stroke in each machine cycle, a latch means having a positive driving connection with a type bar and normally latched to said driving member for positive drive of said type bar by said driving member, a differential actuator member, a yielding connection between said actuator member and said latch means permitting limited movement of said driving member, latch means and type bar relative to said actuator member when the latter is stopped in its advance stroke by said indexing means, while said latching means is latched to said driving member, means operable by such movement of the latch means relative to said actuator member to disconnect said latch means from said driving member, and locking means operable by said relative movement to lock said actuator member, latch means and type bar in indexed position while said driving member completes its normal advance stroke, said locking means and driving member having portions cooperating to unlock said locking means and to relatch said latch means to said driving member upon return of the driving member to the point at which said latch means was disconnected therefrom.

3. A calculating machine having a plural order differential mechanism including, for each order, a differential actuator reciprocable from and to a normal position, amount setting means to arrest said actuators at selected amount differential positions displaced from said normal position proportionally to amounts set in said means, means to reciprocate said actuators including an actuator driving means and, for each actuator, an auxiliary member reciprocable with said actuator between said normal position and any amount differential position in which the latter may be arrested and to a limited extent further than and relatively to said actuator while the latter is arrested, and an individual coupling member normally coupled to said actuator driving means and connected to said auxiliary member for reciprocating the latter, said coupling member and actuator having elements cooperating during continuing movement of said coupling and auxiliary members to said limited extent further from normal position by said driving means after arrest of said actuator to uncouple said coupling member from said driving means and again cooperating during return movement of said coupling and auxiliary members to said limited extent to recouple said coupling member to said driving means, and a plural order printing mechanism including, for each order, a reciprocable type carrier having a series of digit types thereon, and means connecting said type carrier to the auxiliary member of the corresponding order of said differential mechanism for indexing said type carrier by said auxiliary member to place selected ones of said digit types at a printing line, said type carriers being normally positioned with their "0" types short of said printing line by a distance equal to that through which they are moved by said connecting means as said auxiliary members move relative to the respective actuators.

4. A calculating machine having a plural order differential mechanism including, for each order, a differential actuator reciprocable from and to a normal position, settable means to arrest said actuators in said normal position or at selected differential positions displaced from said normal position corresponding to settings of said settable means, means to reciprocate said actuators including a single actuator driving member and, for each actuator, an auxiliary member reciprocable with said actuator between said normal position and any differential position in which the latter may be arrested and to a limited extent further than and relatively to said actuator while the latter is arrested, and an individual coupling member normally coupled to said actuator driving member by direct engagement thereof and connected to said auxiliary member for reciprocating the latter, said coupling member and actuator having elements cooperating during continuing movement of said coupling and auxiliary members to said limited extent further from normal position by said driving member after arrest of said actuator to uncouple said coupling member from said driving member and again cooperating during return movement of said coupling and auxiliary members to said limited extent to recouple said coupling member to said driving means.

5. A calculating machine having cyclically operable general operating means, a plurality of orders of depresible amount keys, means to latch depressed keys in depressed position, means to release said keys, means to restore depressed keys when released, and a plural order differential mechanism comprising for each order of amount keys, differential stop means operable from a normal ineffective position to a differential position determined by a depressed key of said order and again to said normal position, a differential actuator operable from a normal position to a differential position in which it is stopped by said stop means and again to said normal position, and means independent of said differential stop means to block said actuator means against movement beyond the differential position in which it has been stopped by said stop means, and said general operating means comprising portions to operate the differential actuators to their differential positions and subsequently to return them to their normal positions, to operate the stop means to their key-determined positions prior to operation of said differential actuators to their differential positions, to restore said stop means to their normal positions while said differential actuators are held in their differential positions by said blocking means and to operate said key-releasing means while said differential actuators are held in their differential positions by said blocking means.

References Cited in the file of this patent

UNITED STATES PATENTS

| Number | Name | Date |
|---|---|---|
| 895,664 | McFarland | Aug. 11, 1908 |
| 973,683 | McFarland | Oct. 25, 1910 |
| 1,281,792 | Knistrom | Oct. 15, 1918 |
| 1,286,769 | Quentell | Dec. 3, 1918 |
| 1,591,664 | Ekman | July 6, 1926 |
| 1,693,279 | Kreider | Nov. 27, 1928 |
| 1,817,451 | Gubelmann | Aug. 4, 1931 |
| 2,108,476 | Dahlberg | Feb. 15, 1938 |
| 2,176,561 | Placke | Oct. 17, 1939 |
| 2,303,692 | Hellgren | Dec. 1, 1942 |
| 2,467,441 | Noller et al. | Apr. 19, 1949 |
| 2,567,120 | Nolde | Sept. 4, 1951 |